United States Patent
Yamamoto

(10) Patent No.: US 9,821,833 B2
(45) Date of Patent: Nov. 21, 2017

(54) IMPACT ABSORBING STEERING APPARATUS

(71) Applicant: NSK LTD., Tokyo (JP)

(72) Inventor: Ko Yamamoto, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/108,684

(22) PCT Filed: Nov. 9, 2015

(86) PCT No.: PCT/JP2015/081482
§ 371 (c)(1),
(2) Date: Jun. 28, 2016

(87) PCT Pub. No.: WO2016/076266
PCT Pub. Date: May 19, 2016

(65) Prior Publication Data
US 2016/0347349 A1 Dec. 1, 2016

(30) Foreign Application Priority Data

Nov. 10, 2014 (JP) ................................. 2014-227837

(51) Int. Cl.
*B62D 1/19* (2006.01)

(52) U.S. Cl.
CPC ............... *B62D 1/19* (2013.01); *B62D 1/192* (2013.01); *B62D 1/195* (2013.01)

(58) Field of Classification Search
CPC .......... B62D 1/19; B62D 1/192; B62D 1/195; B62D 1/18

USPC ............ 280/777; 74/492, 493; 188/377, 371
See application file for complete search history.

(56) References Cited

U.S. PATENT DOCUMENTS

| 4,901,592 A * | 2/1990 | Ito .......................... B62D 1/195 188/371 |
| 5,378,021 A | 1/1995 | Yamaguchi et al. |
| 8,590,933 B2 | 11/2013 | Narita et al. |
| 2007/0137377 A1 | 6/2007 | Kamei |
| 2012/0080874 A1 | 4/2012 | Narita et al. |

FOREIGN PATENT DOCUMENTS

| JP | S 63-46972 A | 2/1988 |
| JP | H 5-75057 U | 10/1993 |
| JP | H 10-29544 A | 2/1998 |

(Continued)

OTHER PUBLICATIONS

Search Report ( PCT/ISA/210) dated Dec. 8, 2015, issued by the International Searching Authority in counterpart International Application No. PCT/JP2015/081482.

(Continued)

*Primary Examiner* — Keith Frisby
(74) *Attorney, Agent, or Firm* — Sughrue Mion, PLLC

(57) ABSTRACT

An energy absorbing member is fixed to an outer periphery of an inner column, extends in a front-rear direction and is introduced into a slit of an outer column. During a secondary collision, a tightening rod is displaced forward together with the outer column, so that the energy absorbing member is vertically restrained to the tightening rod and the inner column from a up-down direction, is crushed by the tightening rod and generates impact absorption load.

11 Claims, 20 Drawing Sheets

(56) References Cited

FOREIGN PATENT DOCUMENTS

| | | |
|---|---|---|
| JP | 2005-75250 A | 3/2005 |
| JP | 2008-280002 A | 11/2008 |
| JP | 2009-208506 A | 9/2009 |
| JP | 2011-93444 A | 5/2011 |
| JP | 5293825 B2 | 9/2013 |
| WO | 2015104214 A1 | 7/2015 |

OTHER PUBLICATIONS

Written Opinion (PCT/ISA/237) dated Dec. 8, 2015, issued by the International Searching Authority in counterpart International Application No. PCT/JP2015/081482.
Communication issued by the European Patent Office on Sep. 25, 2017 in counterpart EP Application No. 15859281.6.

\* cited by examiner

IMPACT ABSORBING STEERING APPARATUS

TECHNICAL FIELD

The present invention relates to improvements on an impact absorbing steering apparatus capable of absorbing impact energy that is to be applied to a steering wheel from a driver's body during a collision accident, while displacing forward the steering wheel. Specifically, the present invention is to implement a structure capable of fully protecting a driver by improving an energy absorption capability during the collision accident.

RELATED ART

As shown in FIG. 14, a vehicle steering apparatus is configured so that it applies a steering angle to front wheels by transmitting rotation of a steering wheel 1 to an input shaft 3 of a steering gear unit 2 and pushing or pulling a pair of left and right tie-rods 4, 4 as the input shaft 3 rotates. The steering wheel 1 is supported and fixed to a rear end portion of a steering shaft 5. The steering shaft 5 is rotatably supported to a cylindrical steering column 6 with being axially inserted into the steering column 6. Also, a front end portion of the steering shaft 5 is connected to a rear end portion of an intermediate shaft 8 via a universal joint 7. A front end portion of the intermediate shaft 8 is connected to the input shaft 3 via a separate universal joint 9.

In order to protect a driver, it is necessary for the vehicle steering apparatus to have such a structure that impact energy is to be absorbed during a collision accident, while displacing forward the steering wheel. That is, during the collision accident, after a primary collision of an automobile with another automobile, a secondary collision occurs in which a driver's body hits against the steering wheel. A technology for protecting the driver by lessening the impact to be applied to the driver's body during the secondary collision has been conventionally known and widely used. For example, Patent Document 1 discloses that a steering column configured to support a steering wheel is supported to a vehicle body so that it can be detached forward by forward impact load caused due to the secondary collision, and an energy absorbing member configured to be plastically deformed and to absorb the impact load is provided between the vehicle body and a part configured to be forward displaced together with the steering column.

FIGS. 15 to 18 depict an example of a specific structure of a vehicle steering apparatus having an impact absorbing function. The steering apparatus has a tilt mechanism for adjusting a position of the steering wheel 1 in an up-down direction (refer to FIG. 14) and a telescopic mechanism for adjusting a position thereof in a front-rear direction. Also, the steering apparatus has a steering column 6a, a support bracket 10, a pair of left and right held wall parts 11, 11 provided at the steering column 6a, and a vehicle body-side bracket 12. The steering column 6a is configured so that an entire length of the steering column 6a can be extended and contracted by fitting a front part of a rear outer column 13 and a rear part of a front inner column 14 to be axially displaceable with each other. A steering shaft 5a is rotatably supported to an inner diameter-side of the steering column 6a. The steering shaft 5a is also configured so that an entire length of the steering shaft 5a can be extended and contracted by a combination of an outer shaft and an inner shaft.

A housing 16 for mounting constitutional components of an electric power steering apparatus such as an electric motor 15 (refer to FIG. 14), a decelerator and the like is connected and fixed to a front end portion of the steering column 6a. The housing 16 is pivotally supported to a part of the vehicle body by a bolt (not shown) inserted through a support pipe 17 provided in a width direction (a width direction of a vehicle with being mounted to the vehicle) at the top of the housing. The steering wheel 1 is fixed to a part of a rear end portion of the steering shaft 5a, which more protrudes backward than the steering column 6a. Also, a part of a front end portion of the steering shaft 5a, which more protrudes forward than the steering column 6a, is coupled to the intermediate shaft 8 (refer to FIG. 14) via the universal joint 7.

Also, the support bracket 10 is connected and supported to the vehicle body-side bracket 12 so that it can displace (separate) forward by the impact load caused due to the secondary collision. The support bracket 10 is configured by connecting and fixing a top plate 18 and a pair of left and right side plates 19a, 19b, each of which is made of a metal plate such as steel plate having sufficient strength and stiffness, through a welding or the like. Both end portions in the width direction of the top plate 18 function as connection plate parts 20, 20 for connecting and supporting the support bracket 10 to the vehicle body-side bracket 12. As shown in FIG. 18, notches 21, 21 opening towards rear end edges of the connection plate parts 20, 20 are formed at central portions in the width direction of the connection plate parts 20, 20. Capsules 22, 22 are mounted in the notches 21, 21.

The capsules 22, 22 are made of a material that easily slides relative to the metal plate configuring the top plate 18, such as a synthetic resin or soft metal such as an aluminum-based alloy. At a normal state, the capsules 22, 22 do not come out from the notches 21, 21. However, when high impact load is applied in the forward direction to the support bracket 10, engaging parts (for example, fixing pins that span between the top plate 18 and the capsules 22, 22) with the notches 21, 21 are ruptured, so that the capsules come out backward from the notches 21, 21. Through-holes 23, 23 through which bolts or studs are inserted for connecting and supporting the support bracket 10 to the vehicle body-side bracket 12 are formed at central portions of the capsules 22, 22. In order to connect and support the support bracket 10 to the vehicle body-side bracket 12, the bolts inserted from bottom to top through the through-holes 23, 23 of the capsules 22, 22 are screwed and further tightened to nuts 24, 24 supported and fixed to the vehicle body-side bracket 12 by the welding or the like. Since the vehicle body-side bracket 12 is fixed in advance to the vehicle body-side, the support bracket 10 is connected and supported to the vehicle body by tightening the bolts so that it can be detached forward only when the high impact load is applied in the forward direction. In the meantime, the support bracket 10 may also be connected and supported to the vehicle body-side bracket 12 by inserting the studs fixed to a lower surface of the vehicle body-side bracket 12 from top to bottom through the through-holes 23, 23 of the capsules 22, 22 and screwing and further tightening nuts to lower end portions of the studs.

The side plates 19a, 19b are provided with a pair of holding plate parts 25a. 25b configured to sandwich the outer column 13 from both sides. Long holes 26, 26 in the up-down direction are formed at positions at which the pair of holding plate parts 25a. 25b is aligned with each other. The long holes 26, 26 in the up-down direction have a partial arc shape about a central axis of the support pipe 17. The outer column 13 is supported between both the side plates 19a, 19b by a tightening rod 27 inserted into the long holes 26, 26 in the up-down direction. To this end, the held wall parts 11, 11 are provided at a front-upper part of the outer column 13, and long holes 28, 28 in the front-rear direction (refer to FIGS. 2 and 4 depicting an illustrative embodiment of the present invention), which are long in an axial direction of the outer column 13, are formed in the held wall parts 11, 11. The outer column 13 is supported to the support bracket 10 by the tightening rod 27 inserted through the long holes 26, 26 in the up-down direction and the long holes 28, 28 in the front-rear direction. Therefore, the outer column 13 can pivot upward or downward about the bolt inserted into the support pipe 17 within a range in which the tightening rod 27 can be displaced in the long holes 26, 26 in the up-down direction. Also, the outer column 13 can be displaced forward or backward (axial direction) within a range in which the tightening rod 27 can be displaced in the long holes 28, 28 in the front-rear direction.

An outward facing flange-shaped collar part 29 is fixed to one end portion (a right end portion in FIG. 16) of the tightening rod 27, and a cam unit 32 having a driving cam 30 and a driven cam 31 is provided at the other end portion thereof. The collar part 29 and the driven cam 31 correspond to a pair of pressing parts defined in the claims. By using an adjustment lever 33 to rotate and drive the driving cam 30, it is possible to increase/decrease a distance between the driven cam 31 and the collar part 29. When adjusting a position of the steering wheel 1, the adjustment lever 33 is rotated downward to increase the distance between the driven cam 31 and the collar part 29. At this state, the outer column 13 is displaced within a range in which the tightening rod 27 can be displaced in the long holes 26, 26 in the up-down direction and the long holes 28, 28 in the front-rear direction. Thereby, a position of the steering wheel 1, which is supported and fixed to the rear end portion of the steering shaft 5a rotatably supported in the outer column 13, is adjusted. A weight of a part that moves up and down together with the outer column 13 is supported by a balancing spring 35 provided between the tightening rod 27 and a locking part 34 provided for the support bracket 10. For this reason, it is not necessary for the driver to carry the entire weight even when adjusting the position of the steering wheel 1.

After adjusting the position of the steering wheel 1, the adjustment lever 33 is rotated upward to decrease the distance between the driven cam 31 and the collar part 29. As a result, inner surfaces of the holding plate parts 25a. 25b come in strong contact with outer surfaces of the held wall parts 11, 11 (frictional engagement), so that a position of the steering wheel 1 in the up-down direction is fixed. Also, a diameter of the front end portion of the outer column 13 for which the held wall parts 11, 11 are provided is decreased and an inner periphery of the front end portion of the outer column 13 comes in strong contact with an outer periphery of the rear end portion of the inner column 14 (frictional engagement), so that the steering column 6a cannot extend and contract. As a result, a position of the steering wheel 1 in the front-rear direction is fixed.

According to the vehicle steering apparatus as described above, when a secondary collision occurs after a collision accident, the capsules 22, 22 remain on the vehicle body-side bracket 12 and the support bracket 10 is displaced forward. That is, the high impact load in the forward direction, which occurs due to the secondary collision, is applied to the support bracket 10 from the steering wheel 1 via the steering shaft 5a, the outer column 13 and the tightening rod 27. The engaging parts between the capsules 22, 22 and the connection plate parts 20, 20 are ruptured, so that the capsules 22, 22 come out from the notches 21, 21 and the support bracket 10 is displaced forward. As a result, the steering wheel 1 is also displaced forward, so that it is possible to lessen the impact to be applied to the driver's body who hits against the steering wheel 1.

In this way, when the steering wheel 1 is displaced forward during the secondary collision, it is preferable to displace forward the steering wheel 1 while absorbing the impact energy applied to the steering wheel 1 from the driver's body, from an aspect of protecting the driver. For example, in the structure of FIGS. 14 to 18, a frictional force which acts on the contact part between the outer surfaces of the held wall parts 11, 11 and the inner surfaces of the holding plate parts 25a, 25b, and a frictional force, which acts on the contact part between the inner periphery of the front part of the outer column 13 and the outer periphery of the rear part of the inner column 14, become resistance to the forward displacement of the steering wheel 1, and contributes absorbing the impact energy. However, the energy absorption performance based on the frictional forces is unstable, which makes it difficult to fully protect the driver.

Therefore, as disclosed in Patent Document 1, for example, it is considered to provide an energy absorbing member 36 as shown in FIGS. 19 and 20 between a steering column 6b configured to displace forward during a secondary collision and a vehicle body 37. The energy absorbing member 36 formed by bending a plastically deformable wire material is provided between a support pin 38 fixed to an upper surface of the steering column 6b and a holding case 39 fixed to the vehicle body-side. When the steering column 6b is displaced forward due to the secondary collision, the energy absorbing member 36 is elongated from a state of FIG. 20A to a state of FIG. 20B. The energy required for the elongation is absorbed from the impact energy applied to the steering wheel from the driver's body, so that the impact to be applied to the driver's body is lessened.

When an impact absorbing structure using the energy absorbing member 36 as shown in FIGS. 19 and 20 is incorporated into the impact absorbing steering apparatus as shown in FIGS. 14 to 18, it is possible to improve the energy absorption capability. However, in order to obtain better performance at low cost while securing a freedom of design, improvements are needed in following respects.

First, it is needed to reduce or eliminate moment in a pivot direction, which is to be applied to the outer column 13 of the steering column 6a during the secondary collision. That is, when incorporating the structure of FIGS. 19 and 20 into the steering apparatus, the mounting positions of the energy absorbing member 36 and the tightening rod 27 (refer to FIG. 16) may deviate in a perpendicular direction to the central axis of the outer column 13, irrespective of whether or not the position adjustment device of the steering wheel, such as the tilt mechanism and the telescopic mechanism. When the deviation occurs, the moment in the pivot direction occurs during the secondary collision. That is, during the secondary collision, the energy absorbing member 36 functions as a resistance to the forward displacement of the outer column 13. As a result, a moment is applied to the outer column 13 with the tightening rod 27 as a pivot point and the energy absorbing member 36 as an input part. For this reason, as the secondary collision proceeds, a friction state in a fitting part between the outer periphery of the front part of the outer column 13 and the inner periphery of the rear part of the inner column 14 becomes unstable, so that the energy absorption performance in the fitting part becomes unstable.

The instability of the energy absorption performance can be reduced or eliminated by placing both the energy absorbing member 36 and the tightening rod 27 on the same side with respect to the up-down direction of the steering column 6a, 6b and reducing the deviation in the perpendicular direction to the central axis of the steering column 6a, 6b existing between the members 36, 27. In this case, as shown in FIGS. 19 and 20, in the structure where the energy absorbing member 36 is provided between the steering column 6b and the vehicle body 37 located above the steering column 6b, it is not possible to reduce the moment, so that it is not possible to prevent the energy absorption performance from becoming unstable. Further, in the structure of FIGS. 19 and 20, the support pin 38 and the holding case 39 are necessarily required as dedicated components for mounting the energy absorbing member 36 and the components become larger, so that an increase in cost is unavoidable.

A structure capable of solving the instability of the energy absorption performance has been conventionally known, as described in Patent Documents 2 to 4. For example, a configuration where the energy absorbing member is provided on the outer periphery of the outer column 13 close to the central axis of the outer column 13 or near the outer column 13 is disclosed. Patent Document 2 discloses a structure where a plurality of ribs is axially formed on a pipe of a column and the impact is absorbed by the frictional force with a clamp member. However, according to this structure, it is difficult to suppress non-uniformity of impact absorption loads due to non-uniformity of clamp forces, non-uniformity of height sizes of the ribs, non-uniformity of surface roughness of the clamp member and the ribs, and the like.

Patent Document 3 discloses a structure where an energy absorbing member is stored in a slit 43 of an outer column 13a and the energy absorbing member is plastically deformed to absorb the impact by using displacement of a tightening rod associated with displacement of a support bracket 10a during a secondary collision. Also, Patent Document 4 discloses a structure where an energy absorbing member is provided to be parallel with an axis center of a steering column in a space of a lifting bracket 19 fixed to the steering column and the energy absorbing member is plastically deformed to absorb the impact by using displacement of a tightening rod associated with displacement of a support bracket 17 during a secondary collision. However, according to these structures, the energy absorbing member becomes larger, so that an increase in cost is unavoidable.

Patent Document 5 discloses a structure where a stopper member is fixed to an inner column of a rear side and a protrusion for displacement prevention provided for the stopper member is made to face a bolt fixed to an outer column of a front side. When load of a predetermined value or higher is applied from the bolt to the protrusion for displacement prevention, the protrusion for displacement prevention is deformed to absorb the impact. Also, Patent Document 6 discloses a structure where a web is provided for an inner column of a rear side and a fastening bolt is fixed to an outer column of a front side. The web collides with the fastening bolt and functions as an energy absorbing member. According to these structures, the inner column is disposed at the rear side and the outer column is disposed at the front side. In general, one (rear side) of the inner column and the outer column, which is close to a steering, is provided with a lock member configuring a steering lock device. In the structures of Patent Documents 5 and 6, when the lock member is provided for the inner column of a rear side, it is necessary to shorten a stroke of the impact absorption so that the lock member and the outer column do not interfere with each other when the inner column is moved forward due to the secondary collision. As a result, the desired need for the energy absorption may not be satisfied. Therefore, it is preferably to dispose the inner column at the front side and the outer column at the rear side.

CITATION LIST

Patent Documents

Patent Document 1: Japanese Patent Application Publication No. S63-046972A
Patent Document 2: Japanese Patent Application Publication No. H10-29544A
Patent Document 3: Japanese Patent No. 5,293,825B
Patent Document 4: Japanese Utility Model Application Publication No. H5-75057A
Patent Document 5: Japanese Patent Application Publication No. 2005-75250A
Patent Document 6: International Publication No. WO2015/104214

SUMMARY OF THE INVENTION

Problems to be Solved by the Invention

The present invention has been made in view of the above situations, and is to implement a structure of an impact absorbing steering apparatus capable of securing better performance at low cost in a limited space.

Means for Solving the Problems

An impact absorbing steering apparatus of the present invention includes:
an inner column disposed at a front side with a position thereof in a front-rear direction being regulated:
an outer column fitted to an outer side of a rear part of the inner column and configured to extend and contract a diameter of a front part, which is a fitting part with the inner column, by a slit axially provided to the front part;
a steering shaft formed by combining an outer shaft and an inner shaft so that an entire length thereof can be contracted, being rotatably supported to an inner diameter-side of a steering column having the inner column and the outer column, and having a rear end portion protruding backward beyond a rear end opening of the outer column;
a steering wheel supported to the steering shaft:
a pair of held wall parts provided at positions at which the held wall parts sandwich the slit from both left and right sides at the front part of the outer column;
a pair of long holes in a front-rear direction formed at positions at which the pair of held wall parts is aligned with each other;
a support bracket having a pair of left and right holding plate parts and an attaching plate part configured to support the pair of the holding plate parts to a vehicle body, the attaching plate part being supported to the vehicle body so that it can be detached forward based on impact load to be applied during a secondary collision;
a pair of long holes in a up-down direction formed at portions of the pair of holding plate parts at which the long holes are aligned with the pair of long holes in the front-rear direction;
a tightening rod that is to be inserted into the pair of long holes in the front-rear direction and the pair of long holes in the up-down direction; a fixing means expanding and contracting an interval between a pair of pressing parts provided at both end portions of the tightening rod, contracting the diameter of the front part of the outer column in contraction of the interval, and frictionally engaging an inner periphery of the front part of the outer column and an outer periphery of a rear part of the inner column, and an energy absorbing member configured to absorb impact energy that is to be applied to the outer column from the steering wheel during the secondary collision, wherein the energy absorbing member is fixed to the outer periphery of the inner column, extends in the front-rear direction and is introduced into the slit of the outer column, and wherein during the secondary collision, the tightening rod is displaced forward together with the outer column, so that the energy absorbing member is crushed by the tightening rod and generates impact absorption load while the energy absorbing member is restrained to the tightening rod and the inner column from the up-down direction.

Also, a notch may be provided on an upper surface of the energy absorbing member.

Also, the notch may be formed at a center in a left-right direction of the upper surface of the energy absorbing member.

Also, a width of the notch in the left-right direction may be varied as it goes in the front-rear direction.

Also, the width of the notch in the left-right direction may decrease as it goes forward.

Also, the outer periphery of the inner column may be formed with an attachment hole for attaching the energy absorbing member, and the energy absorbing member may have a guide part configured to be engaged to the attachment hole and a hook part configured to be hooked to an inner surface of the inner column and to prevent the energy absorbing member from being detached from the attachment hole.

Also, the energy absorbing member may be integrally formed with the guide part and the hook part.

Also, the energy absorbing member may have an arc-shaped mounting surface so that it is mounted to the outer periphery of the inner column.

Also, a front end of the outer column may be provided with a bridge in which the energy absorbing member is to be inserted, and the bridge of the outer column that is to be displaced forward due to the secondary collision may be displaced with guiding the energy absorbing member.

Also, a clearance may be provided in the front-rear direction between the energy absorbing member and the tightening rod so that load, which occurs when the attaching plate part of the support bracket is detached forward due to impact load applied during the secondary collision, and load, which occurs when the energy absorbing member is crushed by the tightening rod, do not overlap.

The energy absorbing member may be made of brass.

Effects of the Invention

According to the impact absorbing steering apparatus of the present invention configured as described above, it is possible to obtain better performance at low cost in a limited space.

First, the energy absorbing member is fixed to the outer periphery of the inner column so that it is introduced the slit of the outer column and is arranged between the tightening rod and the inner column. Thereby, the energy absorbing member can be arranged in series with the outer column in an axial direction of the outer column, so that it is possible to prevent or reduce the moment in a pivot direction, which is to be applied to the outer column during the secondary collision. The energy absorbing member is plastically deformed by the tightening rod while the fitting part between the front part of the outer column and the rear part of the inner column is slid, so that it is possible to stably absorb the impact energy during the secondary collision. For this reason, it is possible to improve the impact absorption performance without deteriorating a freedom of design.

Also, in order to absorb the impact energy during the secondary collision, not only a frictional resistance of the fitting part between the front part of the outer column and the rear part of the inner column but also the plastic deformation of the energy absorbing member is used. Therefore, it is possible to easily stabilize the impact energy absorption performance and to easily tune the absorption performance. Further, the energy absorbing member is clip-fixed to the attachment hole of the inner column, so that it is not necessary to use a complex method so as to mount the energy absorbing member. For this reason, it is possible to suppress an increase in cost, which is caused due to the energy absorbing member.

DETAILED DESCRIPTION OF ILLUSTRATIVE EMBODIMENTS

Figure 1:
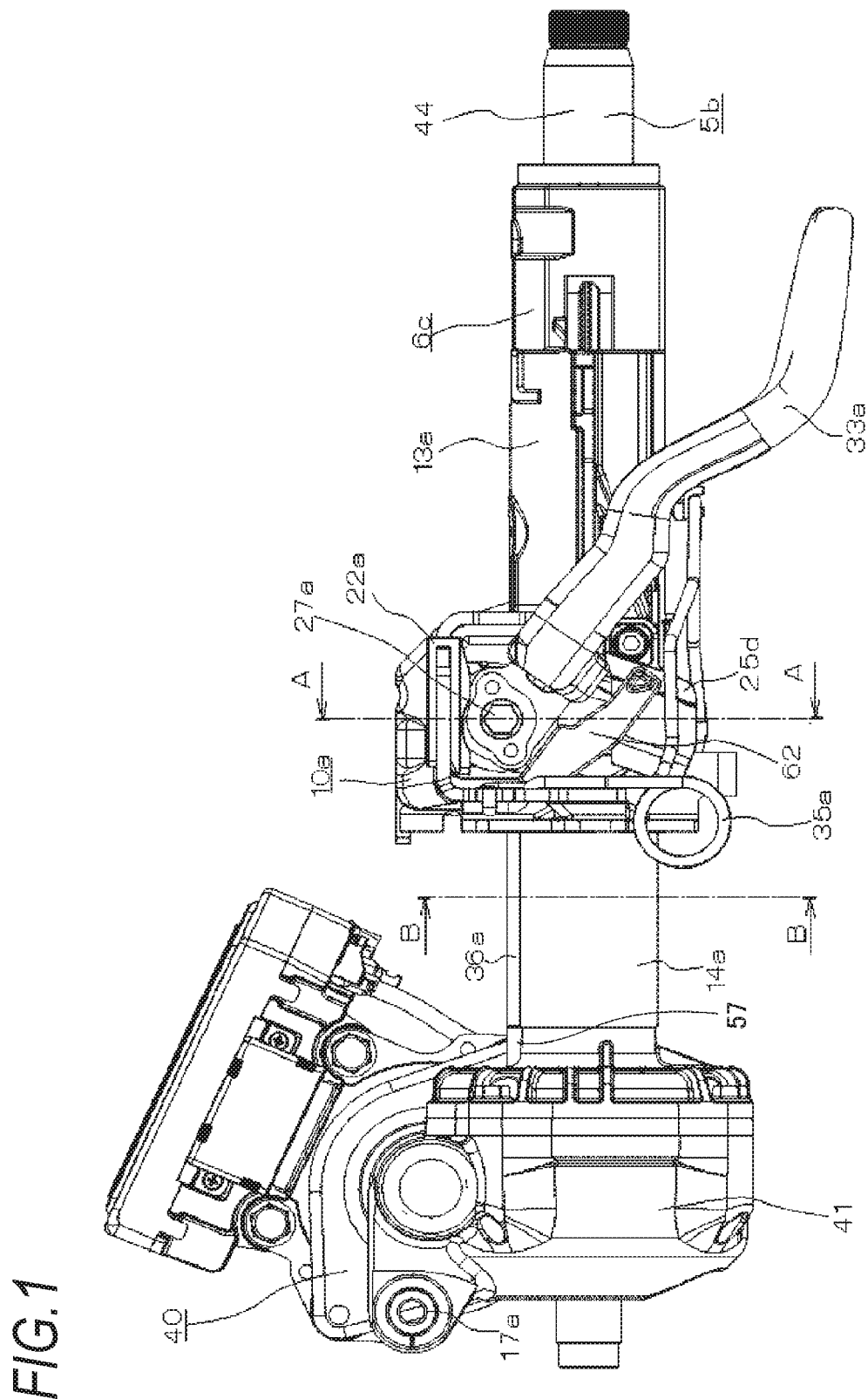
FIG. 1 is a side view depicting an illustrative embodiment of the present invention, as seen from a side
Figure 2:
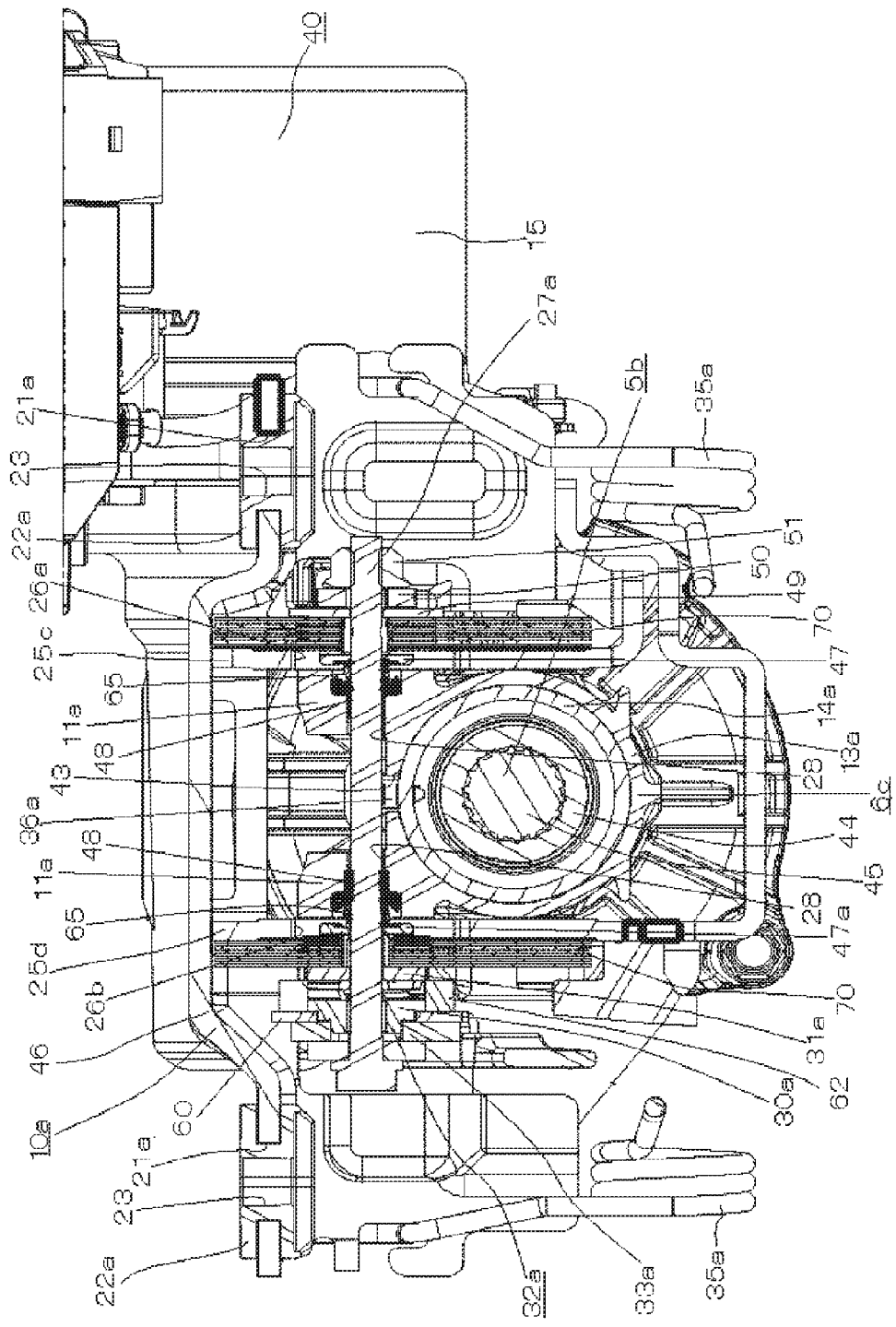
FIG. 2 is an A-A sectional view of FIG. 1.
Figure 3:
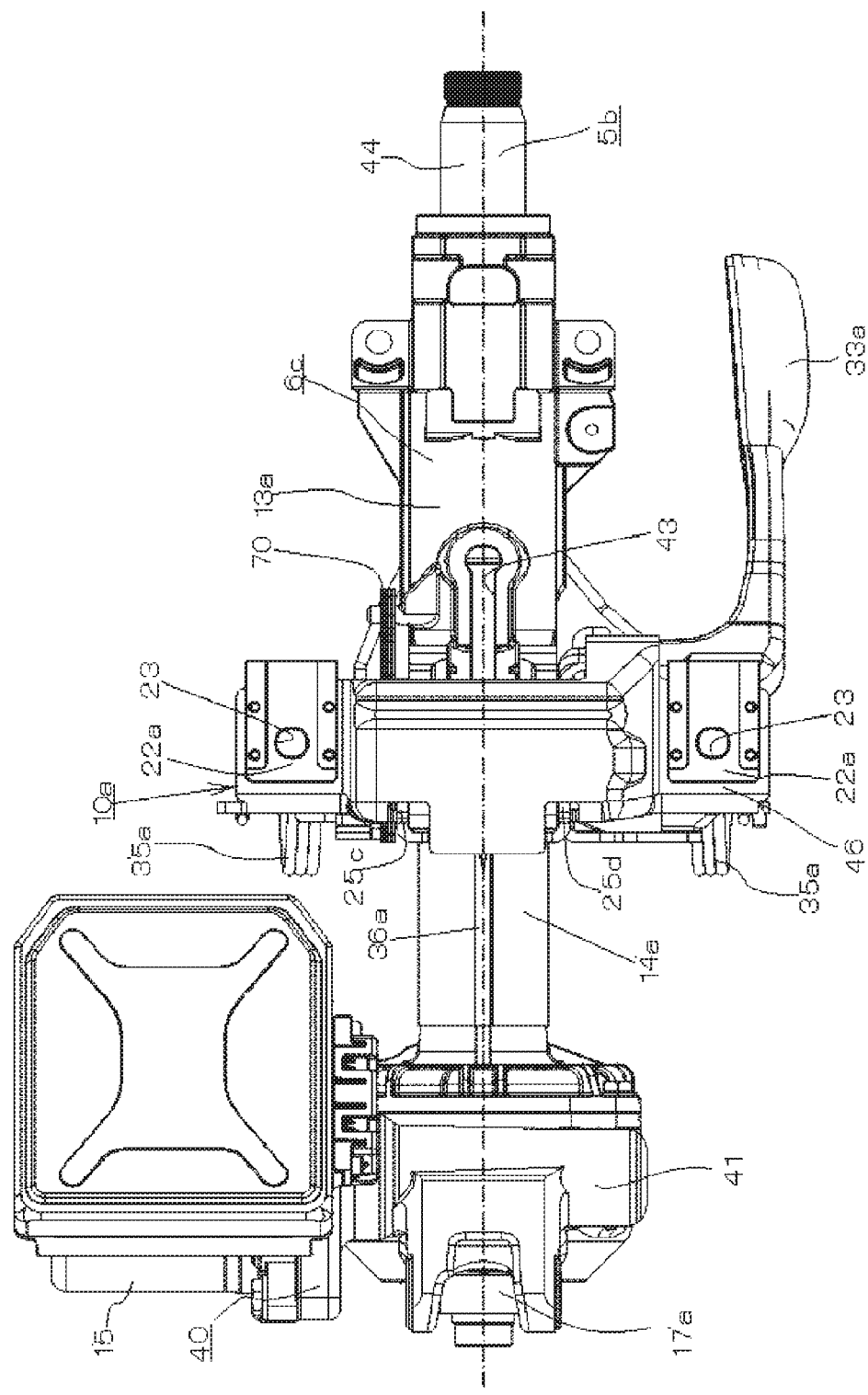
FIG. 3 is a top view depicting the illustrative embodiment of the present invention, as seen from above.
Figure 4:
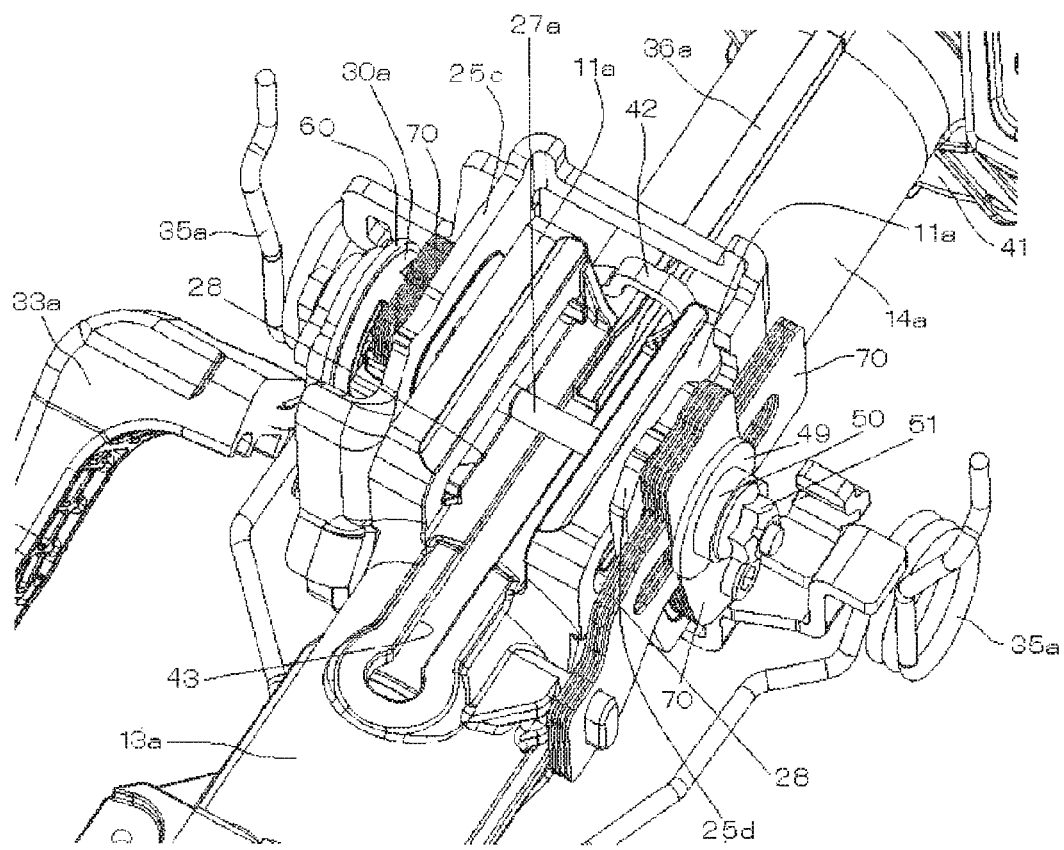
FIG. 4 is an exploded perspective view of a mechanism for adjusting positions of an outer column in front-rear and up-down directions, depicting a state where a support bracket is seen from above with a part thereof being cut.
Figure 5:
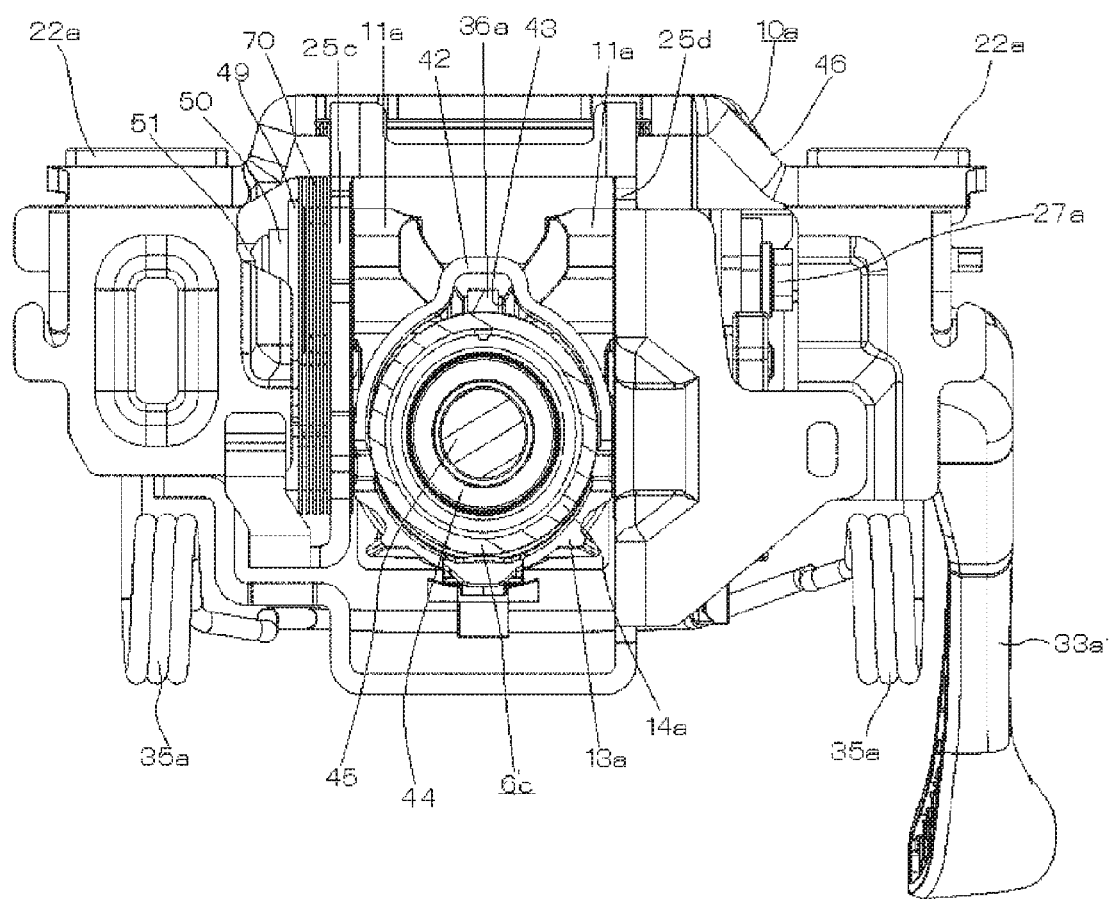
FIG. 5 is a B-B sectional view of FIG. 1.

An example of an illustrative embodiment of the present invention will be described with reference to FIGS. 1 to 9. An impact absorbing steering apparatus of this example includes an inner column 14a, an outer column 13a, a steering shaft 5b, a pair of held wall parts 11a, 11a, a pair of long holes 28, 28 in a front-rear direction each of which it is a first through-hole, a support bracket 10a, a pair of long holes 26a, 26b in a up-down direction each of which is a second through-hole, a tightening rod 27a, and an energy absorbing member 36a.

The inner column 14a is disposed in front of the outer column 13a in a state where a position thereof in the front-rear direction is regulated, i.e., in a state where it is not displaced forward even during a secondary collision. Specifically, a front end portion of the inner column 14a is connected and fixed to a rear end portion of a housing 41 in which constitutional components of an electric power steering apparatus 40, such as a decelerator, are accommodated. The housing 41 is made by die casting of an aluminum alloy, for example, and is formed in a rear wall part thereof with a though-hole for inserting therein a front end portion of the steering shaft 5b. A cylindrical wall part protruding rearward is formed on a peripheral edge portion of the through-hole. The front end portion of the inner column 14a is connected and fixed to the housing 41 by tightly fitting the same to an outer side of the cylindrical wall part with a front end edge thereof coming into contact with the rear wall part. The inner column 14a has a round pipe shape as a whole, and an upper surface of a central portion of an outer periphery thereof is formed with an attachment hole 52, which is long in an axial direction, so as to attach the energy absorbing member 36a thereto.

The outer column 13a is made as a single piece by die casting of an aluminum alloy, for example. A front part of the outer column 13a is fitted to an outer side of a rear part of the inner column 14a. The outer column 13a and the inner column 14a configure a steering column 6c that can extend and contract. In this example, an inner periphery of the outer column 13a and an outer periphery of the inner column 14a come in contact with each other. Also, at this state, it is possible to adjust and fix the position of the outer column 13a in the front-rear direction with respect to the inner column 14a. To this end, a slit 43 is axially provided at the front part of the outer column 13a, which is a fitting part with the inner column 14a, so that it is possible to elastically increase/decrease a diameter of the front part. The outer column 13a is fitted to the outer side of the rear part of the inner column 14a at the front part thereof configured to make it possible to increase/decrease a diameter of the front part, and the position thereof in the front-rear direction can be adjusted on the basis of the axial displacement relative to the inner column 14a.

By forming a spline engagement between female spline teeth formed on an inner periphery of a front half part of an outer shaft 44, which forms a rear half part of the steering shaft 5b, and male spline teeth formed on an outer periphery of a rear half part of an inner shaft 45, which forms a front half part of the steering shaft 5b, the steering shaft 5b is configured so that an entire length can be extended and contracted. A coating layer made of a synthetic resin having a low friction coefficient, such as polyamide resin (nylon), polytetrafluoroethylene resin (PTFE), polyacetal resin or the like, is formed on a surface of at least one set of teeth of the male spline teeth and the female spline teeth. Therefore, the outer shaft 44 and inner shaft 45 are combined so that they can transmit torque and extend and contract under light force. The steering shaft 5b is rotatably supported to an inner diameter-side of the steering column 6c. Specifically, a part near a rear end of an intermediate part of the outer shaft 44 is supported to an inner diameter-side of a rear end portion of the outer column 13a by a rolling bearing such as a single-row deep groove ball bearing capable of supporting both radial load and axial load so that it can rotate freely. Therefore, the outer shaft 44 moves as the outer column 13a moves in the axial direction, and the steering shaft 5b extends and contracts.

The held wall parts 11a, 11a are provided integrally with the outer column 13a at positions at which they sandwich the slit 43 from both left and right sides on an upper surface of the front part of the outer column 13a. At positions at which the held wall parts 11a, 11a are aligned with each other, the long holes 28, 28 in the front-rear direction are respectively formed in the axial direction of the outer column 13a.

The support bracket 10a has a pair of left and right holding plate parts 25c, 25d and an attaching plate part 46. The holding plate parts 25c, 25d and the attaching plate part 46 are all formed by pressing a metal plate such as a carbon steel plate having sufficient strength and stiffness, are connected and fixed together by a welding or the like, and configure a support bracket 10a. The holding plate parts 25c, 25d are configured to hold the held wall parts 11a, 11a provided on the upper surface of the outer column 13a from both the left and right sides. The attaching plate part 46 is configured to support the outer column 13a to a vehicle body via the held wall parts 11a, 11a and to allow the outer column 13a to displace forward during a secondary collision. To this end, like the conventional structure shown in FIGS. 14 to 18, capsules 22a, 22a are provided in a pair of notches 21a, 21a formed at left and right end portions of the attaching plate part 46 so that the capsules can be detached due to impact load that is to be applied during the secondary collision.

The long holes 26a, 26b in the up-down direction have a partial arc shape about a central axis of a support pipe 17a provided at a front-upper part of the housing 41, and are formed at portions of the holding plate parts 25c, 25d, which are aligned with portions in a length direction of the long holes 28, 28 in the front-rear direction. The tightening rod 27a is inserted in the long holes 28, 28 in the front-rear direction and the long holes 26a, 26b in the up-down direction. A telescopic spacer 48, a restoring spring 65, a tilt spacer 47, a multiple plate 70, a washer 49 and a thrust bearing 50 are sequentially fitted on a part (a part near the right in FIGS. 2 and 4) near a tip of an intermediate part of the tightening rod 27a, in corresponding order from a side near a center of the tightening rod 27a. By a nut 51 screwed onto the tip portion of this tightening rod 27a, the respective members are prevented from separating from the tightening rod 27a. Also, by performing crimping deformation of any part of the nut 51 after being screwed onto a necessary location, the nut 51 is prevented from coming loose.

In the meantime, the telescopic spacer 48, the restoring spring 65, the tilt spacer 47a and the multiple plate 70 are sequentially fitted on a part (a part near the left in FIGS. 2 and 4) near a base end of the intermediate part of the tightening rod 27a, in corresponding order from the side near the center of the tightening rod 27a. Further, a cam unit 32a having a driving cam 30a and a driven cam 31a is provided at the base end portion of the tightening rod 27a. In this example, the driven cam 31a and the nut 51 correspond to a pair of pressing parts defined in the claims. The cam unit 32a is configured to rotate and drive the driving cam 30a by an adjustment lever 33a, thereby increasing/decreasing a distance between the driven cam 31a and the nut 51. The driven cam 31a is engaged to the long hole 26b in the up-down direction from an outer surface of the holding plate part 25d so that the displacement (moving up and down) along the long hole 26b in the up-down direction is possible but the rotation thereof is prevented. When adjusting a position of the steering wheel 1, the adjustment lever 33a is rotated downward to increase the distance between the driven cam 31a and the nut 51. The distance increases, so that a contact pressure between the inner surfaces of the holding plate parts 25c, 25d and the left and right side surfaces of the outer column 13a including the held wall parts 11a, 11a is lowered or lost. At the same time, the diameter of the front part of the outer column 13a is elastically expanded, so that a contact pressure between an inner periphery of the front part of the outer column 13a and an outer periphery of the rear part of the inner column 14a is lowered.

At this state, the outer column 13a is displaced within a range in which the tightening rod 27a can displace in the long holes 26a, 26b in the up-down direction and the long holes 28, 28 in the front-rear direction. A position of the steering wheel 1 supported and fixed to the rear end portion of the outer shaft 44, which is rotatably supported in the outer column 13a, i.e., at least one of the position in the front-rear direction and the position in the up-down direction is adjusted. While the adjustment operation is performed, a weight of a part that moves up and down together with the outer column 13 is supported by balancing springs 35a, each of which is a tension spring provided between the housing 41 and the attaching plate part 46 of the support bracket 10a. For this reason, even when adjusting the position of the steering wheel 1, it is not necessary for a driver to carry the entire weight. After moving the steering wheel 1 to a desired position, the adjustment lever 33a is rotated upward to decrease the distance between the driven cam 31a and the nut 51. As a result, the contact pressure between the inner surfaces of the holding plate parts 25c, 25d and the left and right side surfaces of the outer column 13a and the contact pressure between the inner periphery of the front part of the outer column 13a and the outer periphery of the rear part of the inner column 14a are increased, so that the position of the outer column 13a is fixed to a desired location.

At this time, a bridge 42 is provided at a front end of the outer column 13a, so that the front end portions of the holding plate parts 25c, 25d are prevented from being excessively bent. That is, a front end of the slit 43 opens, so that the front end portions of the holding plate parts 25c, 25d distant from a base point of the slit 43 are more likely to be bent than the rear end portions thereof close to the base point of the slit. Reactive forces of the holding plate parts 25c, 25d are different between the front and rear ends of the long holes 28, 28 in the front-rear direction. As a result, an operating force of the adjustment lever 33a is different depending on the position of the steering wheel 1 in the front-rear direction. The difference of the operating force of the adjustment lever 33a can be reduced by the bridge 42 configured to close the front end of the slit 43.

Further, the energy absorbing member 36a, which is a characteristic feature of this example, extends towards a rear end surface of the housing 41 of the electric power steering apparatus 40 from the axially intermediate part of the tightening rod 27a in the slit 43 of the outer column 13a. The energy absorbing member 36a is made of non-ferrous metal, a synthetic resin or the like and has desired strength and stiffness (appropriate for impact energy absorption). As the non-ferrous metal, light metal, noble metal, base metal, metal or the like may be exemplified. Specifically, brass, aluminum, magnesium, titanium or the like may be exemplified. As the synthetic resin, a synthetic resin having a low friction coefficient such as polyamide resin (nylon), polytetrafluoroethylene resin (PTFE), polyacetal resin (POM) or the like may be exemplified.

Figure 6:
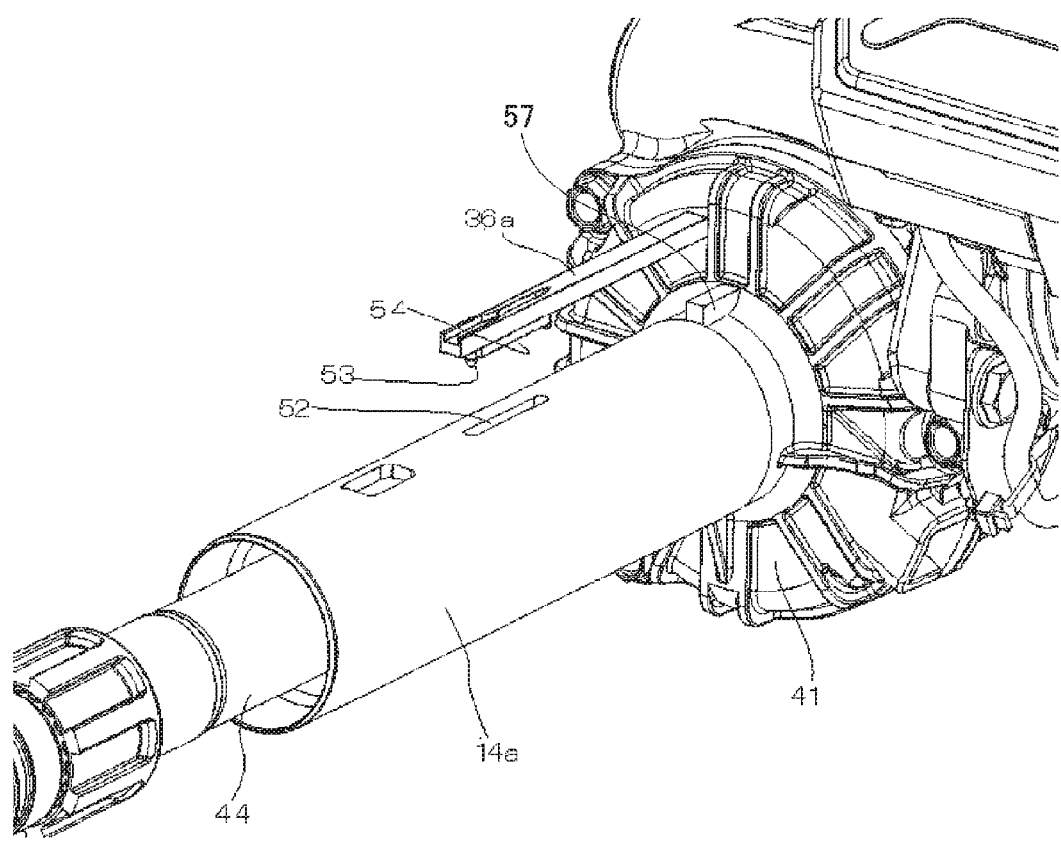
FIG. 6 is an exploded perspective view depicting an energy absorbing member and an inner column.
Figure 8:
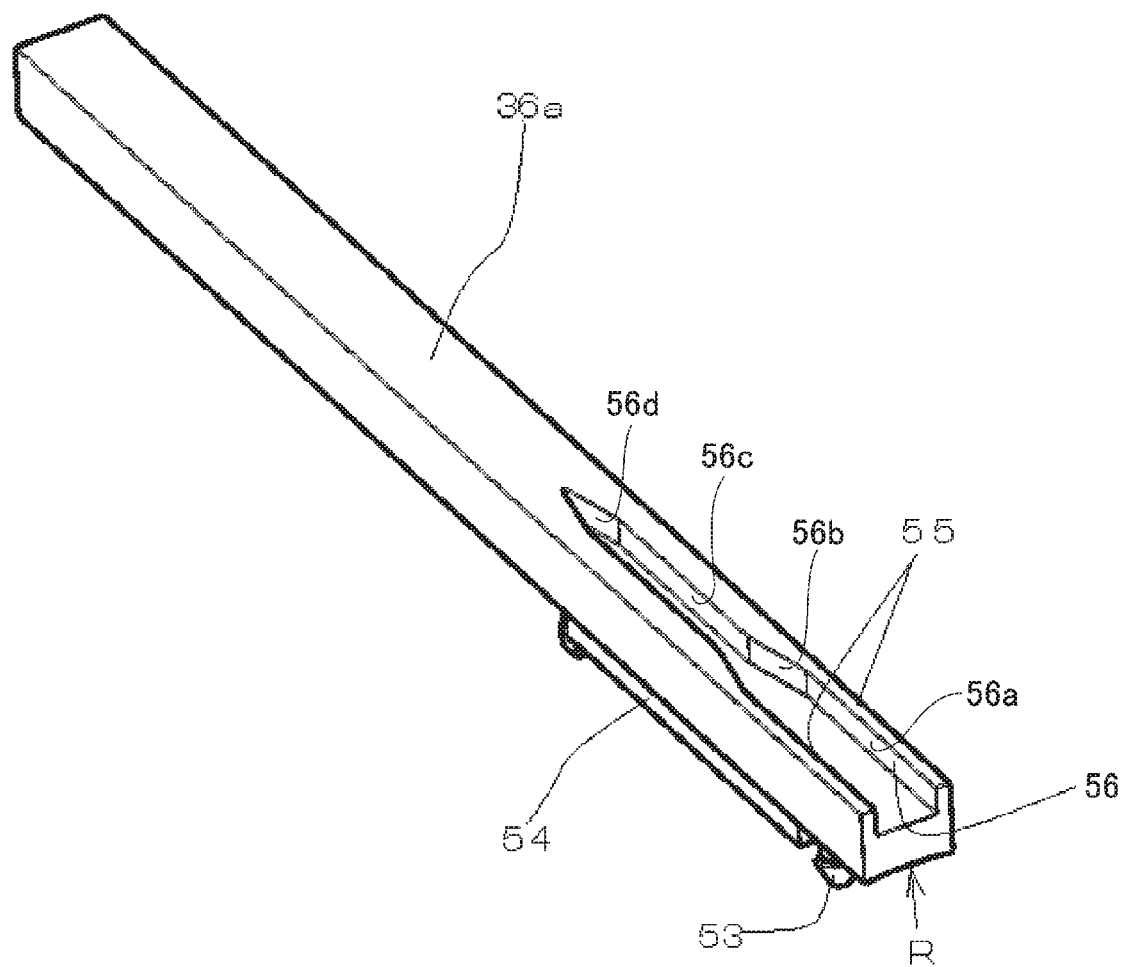
FIG. 8 is an upper perspective view depicting the energy absorbing member.
Figure 9A:
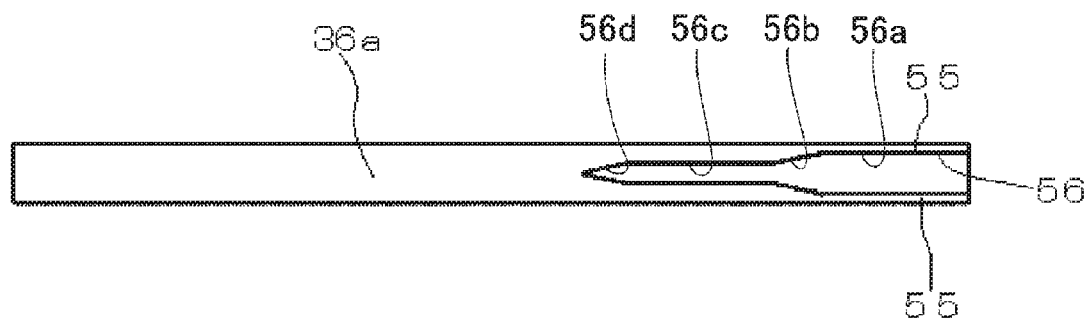
FIG. 9A is a top view of the energy absorbing member.
Figure 9B:
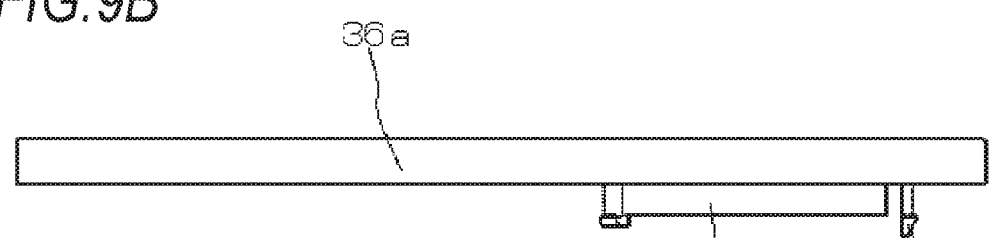
FIG. 9B is a side view of the energy absorbing member.
Figure 9C:
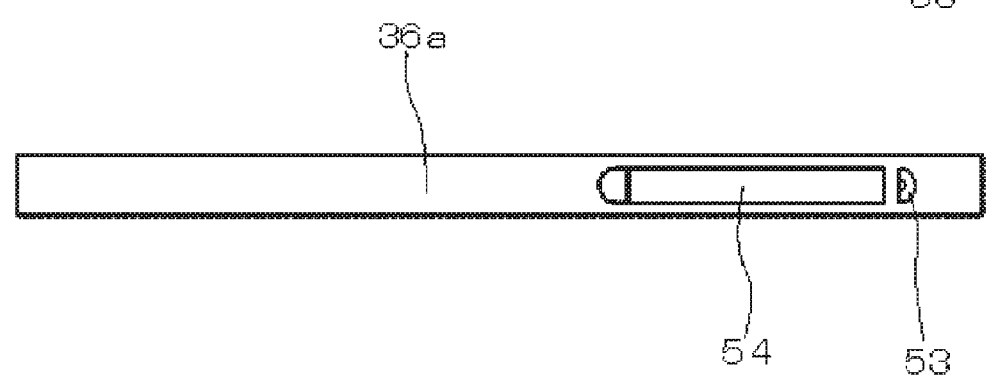
FIG. 9C is a bottom view of the energy absorbing member.

The energy absorbing member 36a has an absorption part 55 capable of being plastically deformed upon absorption of the energy, a guide part 54 configured to be engaged to the attachment hole 52 of the inner column 14a, and a hook part 53, which are integrally formed, as shown in FIGS. 8 and 9. That is, the energy absorbing member 36a is formed as a single piece as a whole. The guide part 54 of the energy absorbing member 36a is engaged to the attachment hole 52 provided on an upper surface of a central portion of the outer periphery of the inner column 14a. Also, the guide part 54 is formed to be long in the axial direction of the column so that it is not deformed and detached in the circumferential direction and in the axial direction with respect to the inner column 14a upon the energy absorption of the secondary collision. The hook part 53 is engaged to the attachment hole 52 of the inner column 14a and then a tip of the hook part 53 is hooked to the inner surface of the inner column 14a, so that the energy absorbing member 36a is not detached from the attachment hole 52. At this time, the direction and shape of the hook part 53 can be changed inasmuch as the detachment can be prevented. In this way, the energy absorbing member 36a is fixed with being restrained to the inner column 14a so that it is not relatively displaced at the normal state and during the secondary collision. Also, as shown in FIGS. 1 and 6, a stopper part 57 arranged to face the energy absorbing member 36a in the front-rear direction is provided on the upper surface of the rear end portion of the outer periphery of the inner column 14a. The stopper part 57 comes in contact with the energy absorbing member 36a in the front-rear direction, or is arranged to face the energy absorbing member 36a with a slight distance in the front-rear direction. By the stopper part 57, the energy absorbing member 36a is prevented from being relatively displaced forward with respect to the inner column 14a. Also, the energy absorbing member 36a has an arc-shaped mounting surface so that it is mounted to the outer periphery of the inner column 14a.

The absorption part 55 provided on the upper surface of the energy absorbing member 36a is formed with a notch 56. In this example, the notch 56 is provided, so that it is possible to adjust a width of the absorption part 55, thereby adjusting an amount of the energy absorption. Further, the notch 56 is arranged at a center in the left-right direction, i.e., is formed to be symmetric with respect to the center in the left-right direction. Thereby, when the absorption part 55 is pressed and crushed by the tightening rod 27a, the energy absorbing member 36a can keep a balanced state so that it is not detached from the cylindrical inner column 14a. A width size of the notch 56 in the left-right direction can be appropriately changed as it goes in the front-rear direction, in correspondence to the necessary energy absorption performance. For example, the notch 56 of this example is provided from the rear end portion of the upper surface of the energy absorbing member 36*a* to a location near the central portion thereof. The notch 56 has a first constant width portion 56*a* provided at the rear end portion of the energy absorbing member 36*a* and having a constant width in the left-right direction, a first tapered portion 56*b* connected to the first constant width portion 56*a* and having a width in the left-right direction which decreases as it goes forward, a second constant width portion 56*c* connected to the first tapered portion 56*b* and having a constant width in the left-right direction, and a second tapered portion 56*d* connected to the second constant width portion 56*c* and having a width in the left-right direction which decreases as it goes forward. In this way, when the width size of the notch 56 in the left-right direction is made to decrease as it goes forward, it is possible to increase the impact energy that is to be absorbed as the secondary collision proceeds. Therefore, it is possible to obtain the preferable performance, as the impact absorbing steering apparatus.

Figure 11:
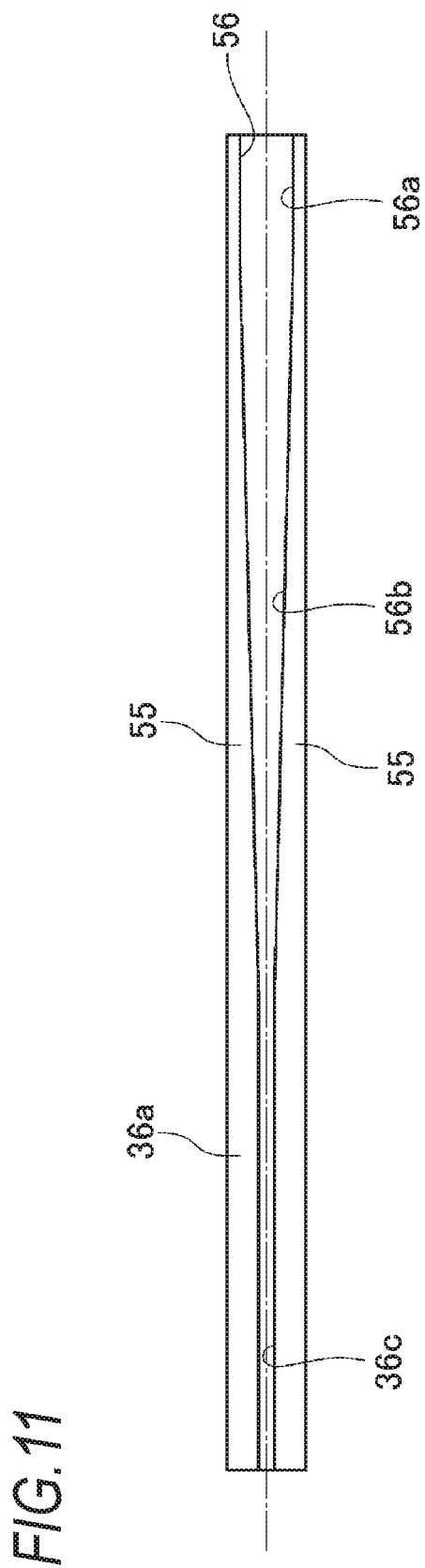
FIG. 11 is a top view depicting a modified embodiment of the energy absorbing member.

In the meantime, the shape of the notch 56 is not limited to the above shape, and any shape can be adopted in correspondence to the desired energy absorption performance. For example, as shown in FIG. 11, the notch 56 may be formed from the rear end portion of the energy absorbing member 36*a* to the front end portion thereof. Also in this example, the notch 56 is arranged at the center of the upper surface of the energy absorbing member 36*a* in the left-right direction. That is, the notch 56 is formed to be symmetric with respect to the center in the left-right direction. Also, the width size of the notch 56 in the left-right direction decreases as it goes forward. More specifically, the notch 56 has a first constant width portion 56*a* provided at the rear end portion of the energy absorbing member 36*a* and having a constant width in the left-right direction, a first tapered portion 56*b* connected to the first constant width portion 56*a* and having a width in the left-right direction which decreases as it goes forward, and a second constant width portion 56*c* connected to the first tapered portion 56*b*, extending to the front end portion of the energy absorbing member 36 and having a constant width in the left-right direction. Even when the shape shown in FIG. 11 is applied, the notch 56 can accomplish the same effect as the configuration shown in FIG. 8.

Figure 7:
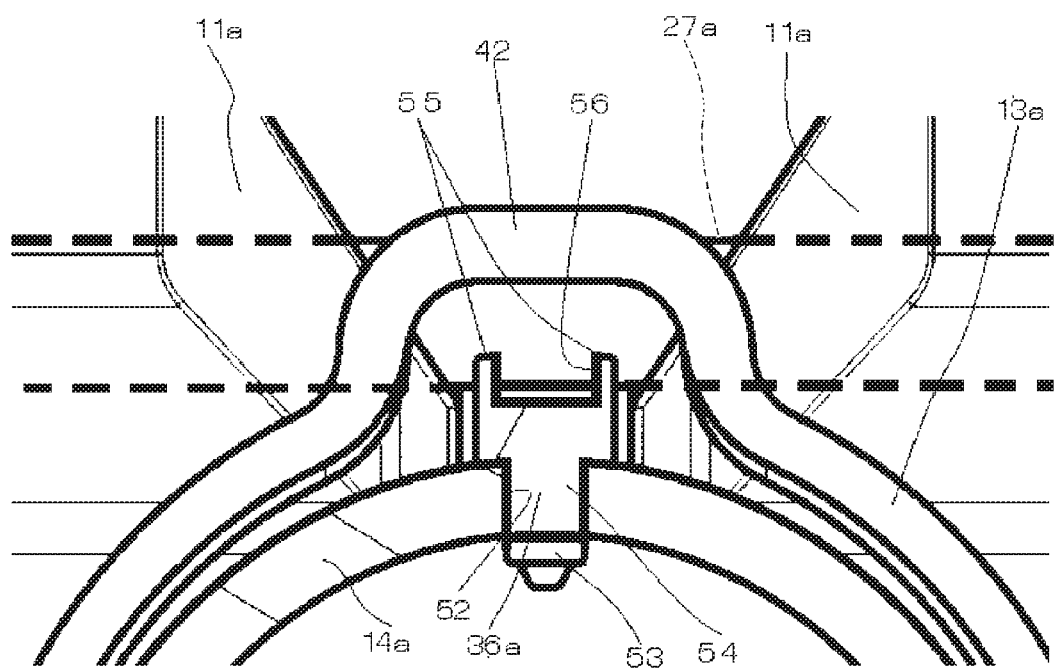
FIG. 7 is a partially enlarged view of FIG. 5.
Figure 10:
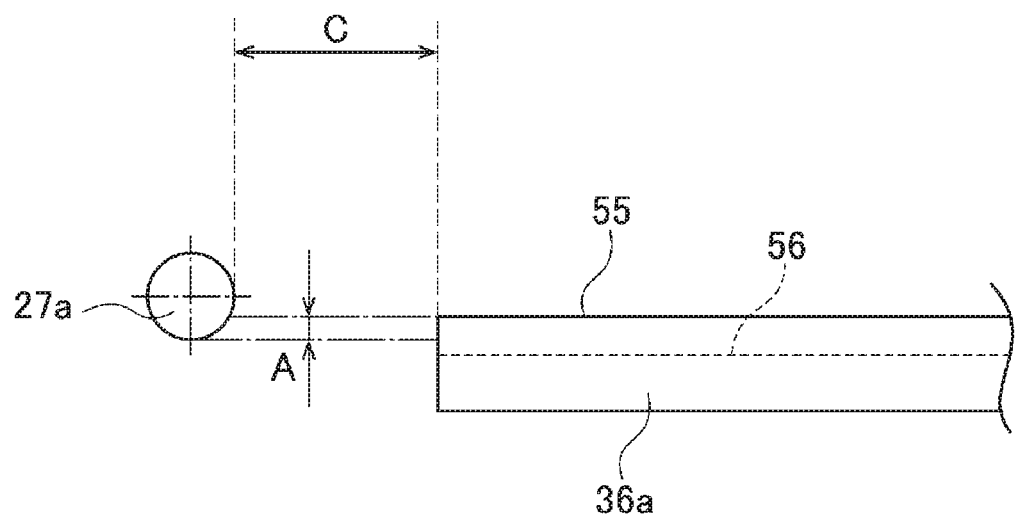
FIG. 10 is a side view depicting the energy absorbing member and the inner column.

The energy absorbing member 36*a* configured as described above is fixed to the outer periphery of the inner column 14*a*, extends in the front-rear direction, and is introduced into the slit 43 of the outer column 13*a* configuring the telescopic mechanism. The held wall parts 11*a*, 11*a* are arranged at the positions at which they sandwich the slit 43 from the left and right sides, and the tightening rod 27*a* inserted in the long holes 28, 28 in the front-rear direction is disposed in the held wall parts 11*a*, 11*a*. At this state, as shown in FIGS. 7 and 10, the absorption part 55 provided on the upper surface of the energy absorbing member 36*a* is arranged to be higher than a bottom of the tightening rod 27*a*. Thereby, the energy absorbing member 36*a* and the tightening rod 27*a* overlap each other in the up-down direction by a predetermined overlapping amount A. A height size of the absorption part 55 can be appropriately changed in correspondence to the necessary energy absorption performance. For example, when the height size of the absorption part 55 is made large, it is possible to increase the impact energy that is to be absorbed during the secondary collision, and when the height size is made small, it is possible to decrease the impact energy that is to be absorbed during the secondary collision. Also, when the height size of the absorption part 55 is made to be lower than the bottom of the tightening rod 27*a*, it is possible not to absorb the impact energy. When this characteristic is partially applied with respect to the axial direction of the energy absorbing member 36*a*, it is possible to prevent the impact energy, which is to be absorbed during the secondary collision, from increasing beyond necessity, considering the load that occurs when the capsules 22*a*, 22*a* come out from the notches 21, 21, for example.

Also, as shown in FIG. 10, a clearance C in the front-rear direction is formed between the energy absorbing member 36*a* and the tightening rod 27*a*. The clearance C is set so that the load (separation load of the capsule 22*a*), which occurs when the attaching plate part 46 of the support bracket 10*a* is detached forward due to the impact load applied during the secondary collision, and the load, which occurs when the energy absorbing member 36*a* is crushed by the tightening rod 27*a*, do not overlap each other. Thereby, it is possible to prevent the excessive load from being applied to the driver at the early stage of the secondary collision.

The absorption part 55 of the energy absorbing member 36*a* having the above configuration and mounted between the tightening rod 27*a* and the inner column 14*a* is plastically deformed as the secondary collision proceeds. That is, while the tightening rod 27*a* is displaced forward together with the outer column 13*a* during the secondary collision, the inner column 14*a* and the energy absorbing member 36*a* stay as they are. Therefore, while the energy absorbing member 36*a* is introduced between the tightening rod 27*a* and the inner column 14*a* and is vertically restrained to the tightening rod 27*a* and the inner column 14*a* from the up-down direction, the absorption part 55 is gradually crushed by the tightening rod 27*a*. At this time, based on the plastic deformation of the energy absorbing member 36*a*, the impact energy transmitted from the steering wheel 1 to the tightening rod 27*a* via the outer shaft 44 and the outer column 13*a* is absorbed. In this case, since the notch 56 is arranged at the central part in the left-right direction of the energy absorbing member 36*a* and has the arc-shaped mounting surface having a radius R so as to be mounted to the outer periphery of the inner column 14*a*, the energy absorbing member is not detached from the cylindrical inner column 14*a* and the energy absorption based on the plastic deformation of the absorption part 55 is stably performed.

Moreover, in the structure of the example, the energy absorbing member 36*a* is fixed to the inner column 14*a*, extends in the front-rear direction and is introduced into the slit 43 of the outer column 13*a* configuring the telescopic mechanism. Also, the energy absorbing member 36*a* is integrally formed with the hook part 53, the guide part 54, the absorption part 55 and the notch 56. Thereby, in the structure of the example, it is not necessary to provide a special component so as to arrange the energy absorbing member 36*a*, and it is possible to arrange the energy absorbing member in a limited space and to improve the impact absorption performance. Further, the energy absorption based on the plastic deformation of the absorption part 55 is stably performed by reducing the frictional force occurring upon the plastic deformation.

Also, the energy absorbing member 36*a* is arranged in the slit 43 of the outer column 13*a* configuring the telescopic mechanism. Therefore, in order to avoid the interference between the energy absorbing member 36*a* and the bridge 42 provided at the front end of the outer column 13*a*, the energy absorbing member 36a is arranged so that it is inserted in the bridge 42 (in the inner column 14a).

Thereby, the bridge 42 of the outer column 13a that is displaced forward during the secondary collision is displaced with guiding the energy absorbing member 36a, so that the energy absorbing member 36a is not detached circumferentially on the inner column 14a. Thereby, the energy absorption based on the plastic deformation of the absorption part 55 is stably performed.

Also, during the secondary collision, the energy absorbing member 36a is vertically restrained to the tightening rod 27a and the inner column 14a from the up-down direction. Further, the energy absorbing member 36a is fixed to be immovable relative to the inner column 14a by the hook part 53 and the guide part 54. Also, the energy absorbing member 36a is prevented from being relatively displaced forward with respect to the inner column 14a by the stopper part 57 of the inner column 14a. In this way, the displacement of the energy absorbing member 36 is suppressed, so that the stable energy absorption can be implemented.

Also, unlike Patent Documents 5 and 6, since the inner column 14a is arranged at the front side and the outer column 13a is arranged at the rear side, it is possible to lengthen a stroke of the impact absorption, so that it is possible to satisfy the desired need for the energy absorption.

Embodiment

In order to investigate an influence of the material of the energy absorbing member 36a on the energy absorption load, a relation between a crushed length (stroke amount) of the energy absorbing member 36a made by bringing the tightening rod 27a into contact with the energy absorbing member 36a and the absorption load was analyzed by changing the material of the energy absorbing member 36a.

Figure 12A:
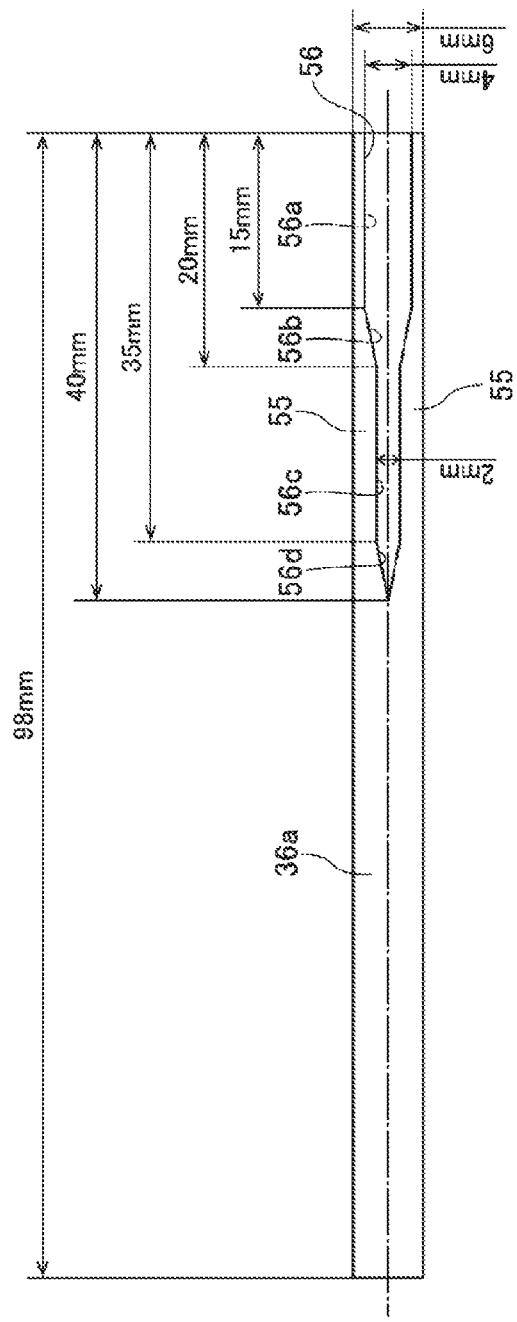
FIG. 12A is a top view depicting an embodiment of the energy absorbing member.
Figure 12B:
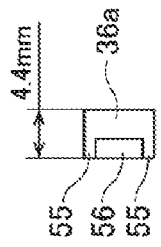
FIG. 12B is a rear view of the energy absorbing member.

The energy absorbing member 36a used for the analysis has the configuration as shown in FIGS. 8 and 9, and sizes of the respective portions are shown in FIG. 12. Also, the overlapping amount A (refer to FIG. 10) of the energy absorbing member 36a and the tightening rod 27a in the up-down direction was 1 mm. Here, in order to smoothly contact the energy absorbing member 36a and the tightening rod 27a each other, the tightening rod 27a was overlapped at a location below the center thereof with the energy absorbing member 36a. Also, as the material of the energy absorbing member 36a, three types of a synthetic resin denoted as POM-GF25 of Japanese Industrial Standards JIS K 6899-1:2006, aluminum denoted as A5052 of Japanese Industrial Standards JIS H 40002014, and brass denoted as C2600 of Japanese Industrial Standards JIS H 31002012 were used. The properties of the three materials are shown in Table 1.

TABLE 1

|  | POM-GF25 (synthetic resin) | A5052 (aluminum) | C2600 (brass) |
| --- | --- | --- | --- |
| modulus of longitudinal elasticity E (N/mm$^2$) | 9400 | 72000 | 103000 |
| Poisson's ratio ν | 0.35 | 0.34 | 0.33 |
| tensile strength $\sigma_B$ (N/mm$^2$) | 145.0 | 125.0 | 350.0 |
| yield point $\sigma_y$ (N/mm$^2$) | 55.0 | 55.0 | 135.0 |
| uniform elongation Et | 0.300 | 0.270 | 0.500 |
| break elongation El | 0.300 | 0.770 | 0.500 |

TABLE 1-continued

|  | POM-GF25 (synthetic resin) | A5052 (aluminum) | C2600 (brass) |
| --- | --- | --- | --- |
| strain hardening coefficient n | 0.20 | 0.20 | 0.20 |

Figure 13:
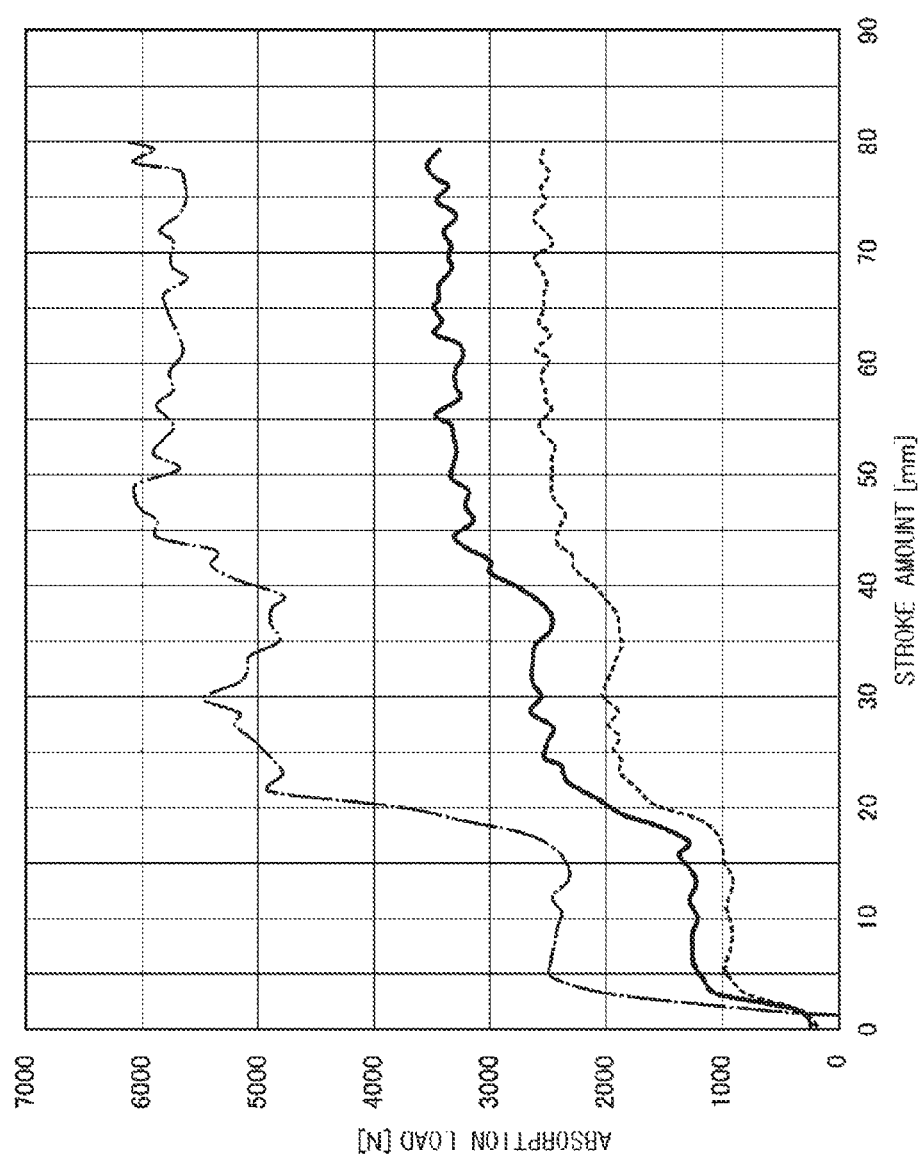
FIG. 13 is a graph depicting a relation between a stroke amount of a tightening rod and absorption load.
Figure 14:
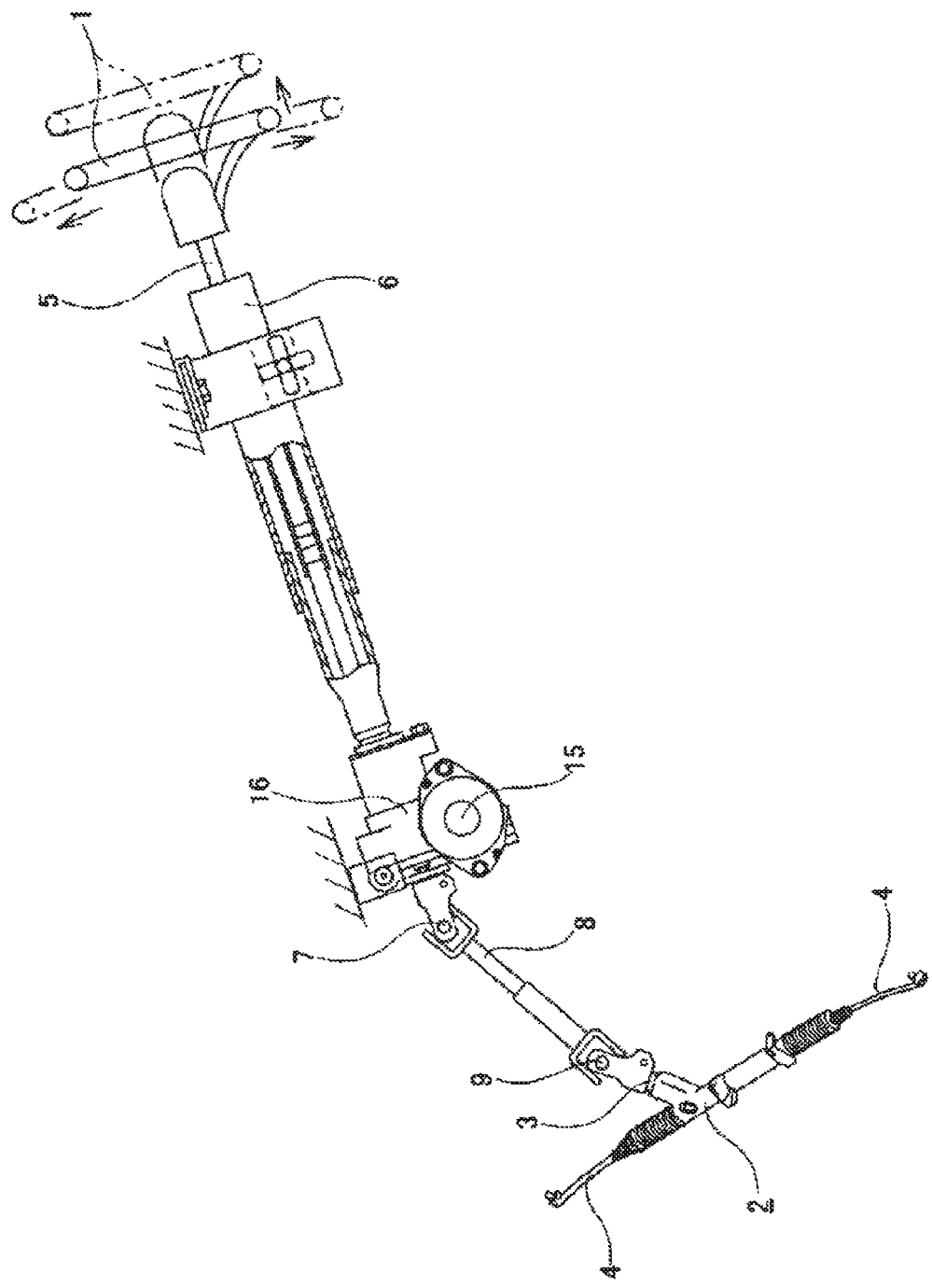
FIG. 14 is a partially cut side view depicting an example of a steering apparatus of the related art.
Figure 15:
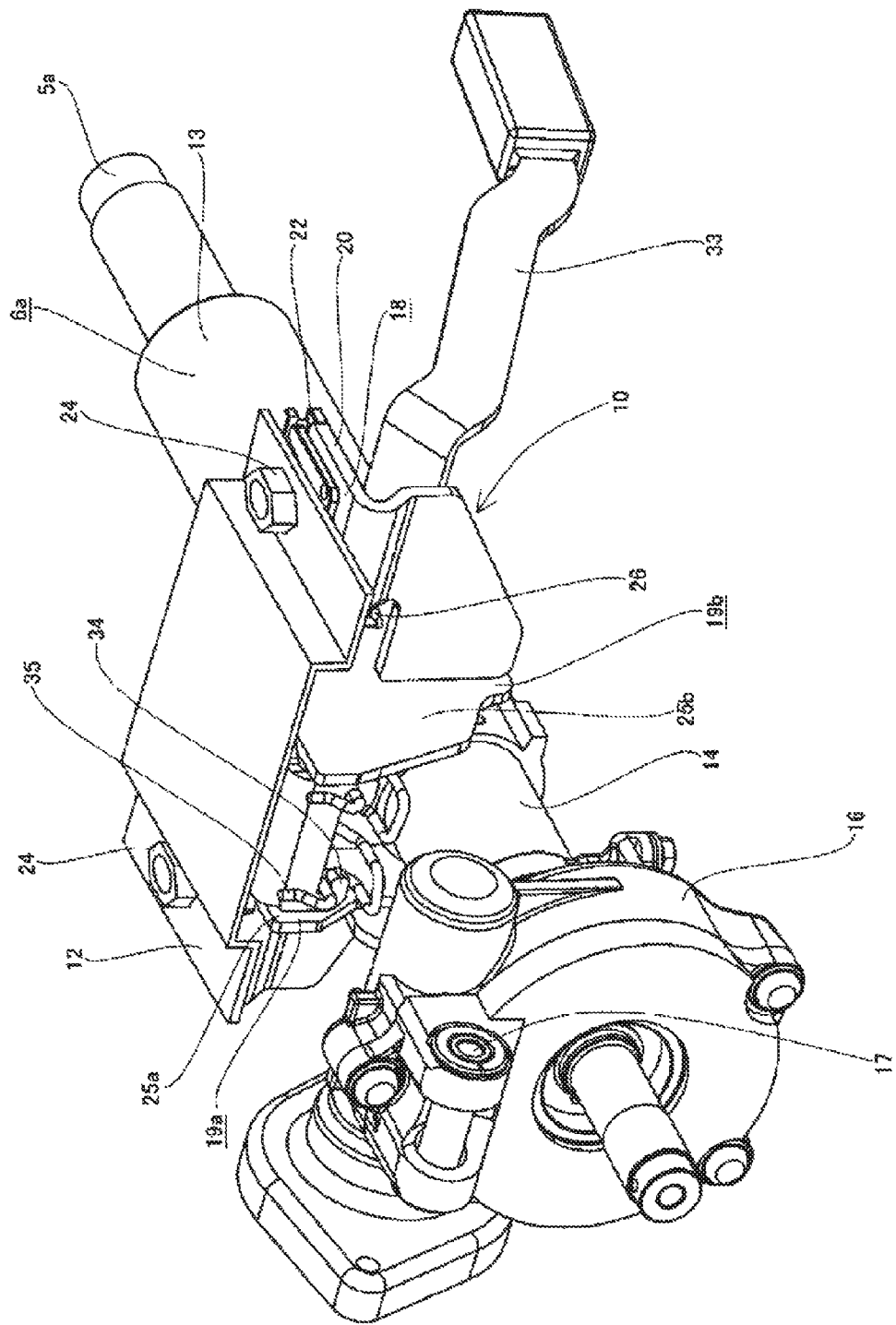
FIG. 15 is a perspective view depicting an example of an impact absorbing steering apparatus of the related art, as seen from a front-upper direction.
Figure 16:
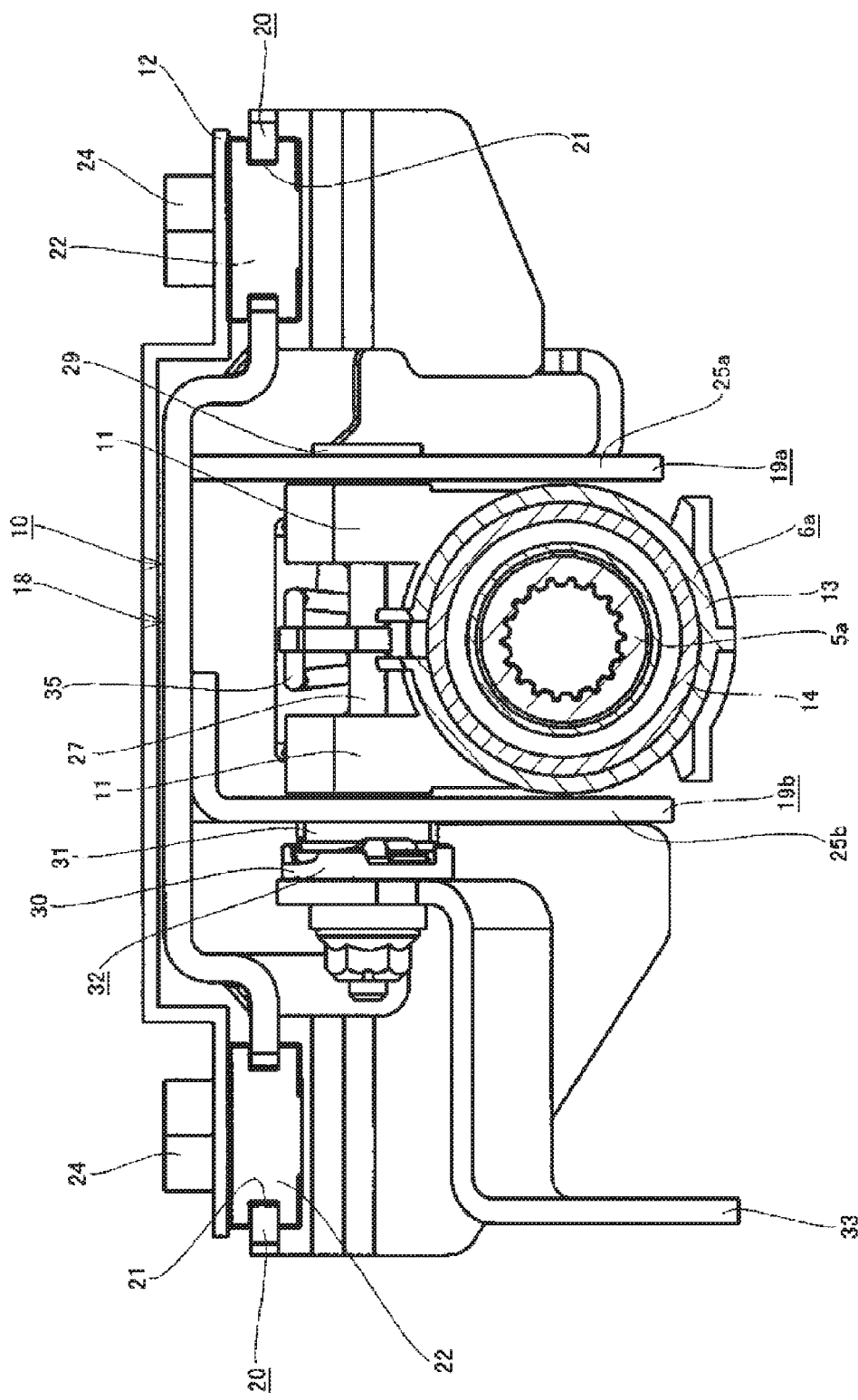
FIG. 16 is a sectional view of an example of an impact absorbing steering apparatus of the related art.
Figure 17:
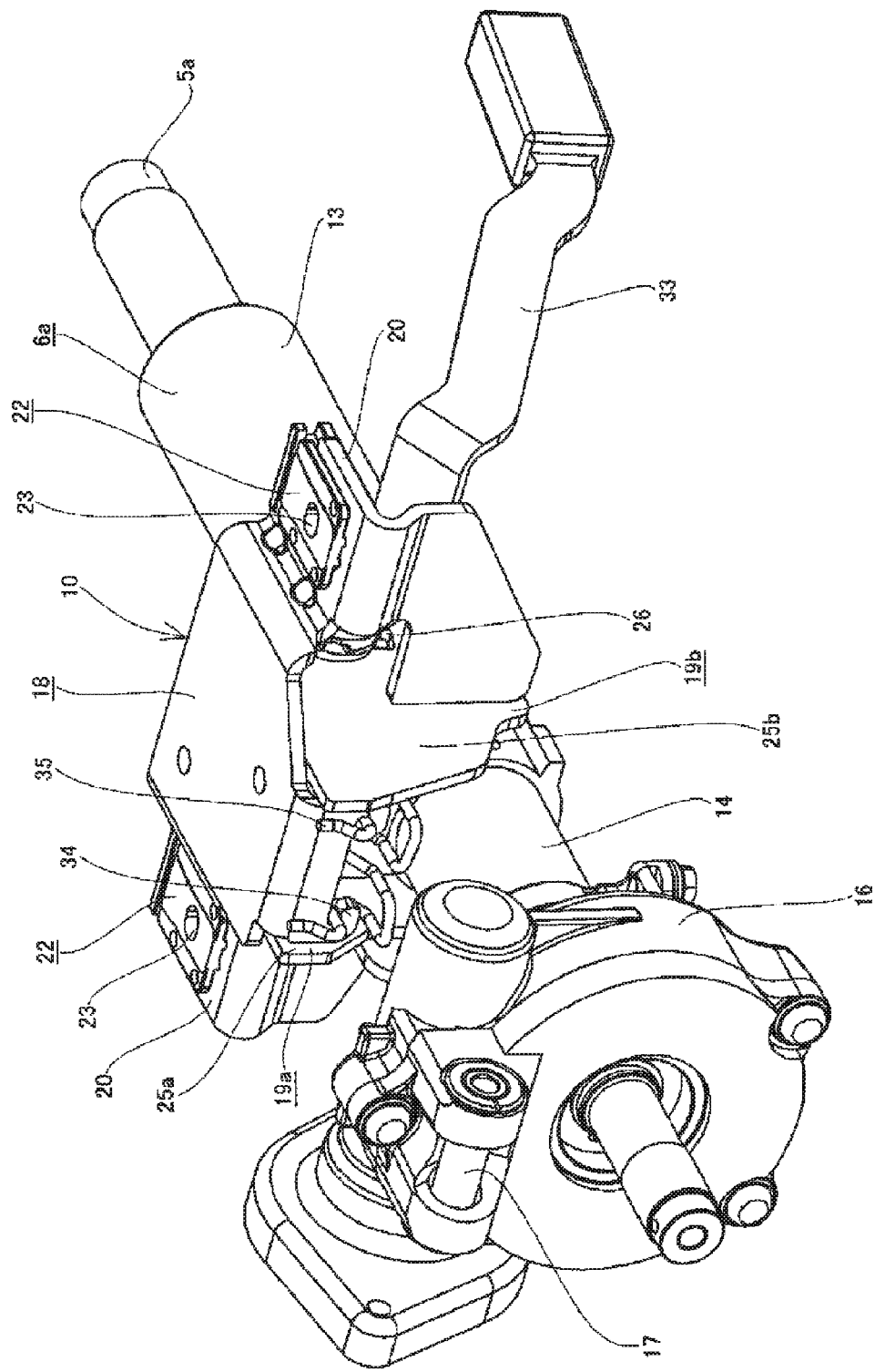
FIG. 17 is the same view as FIG. 15, depicting an example of an impact absorbing steering apparatus of the related art in which a vehicle body-side bracket is omitted.
Figure 18:
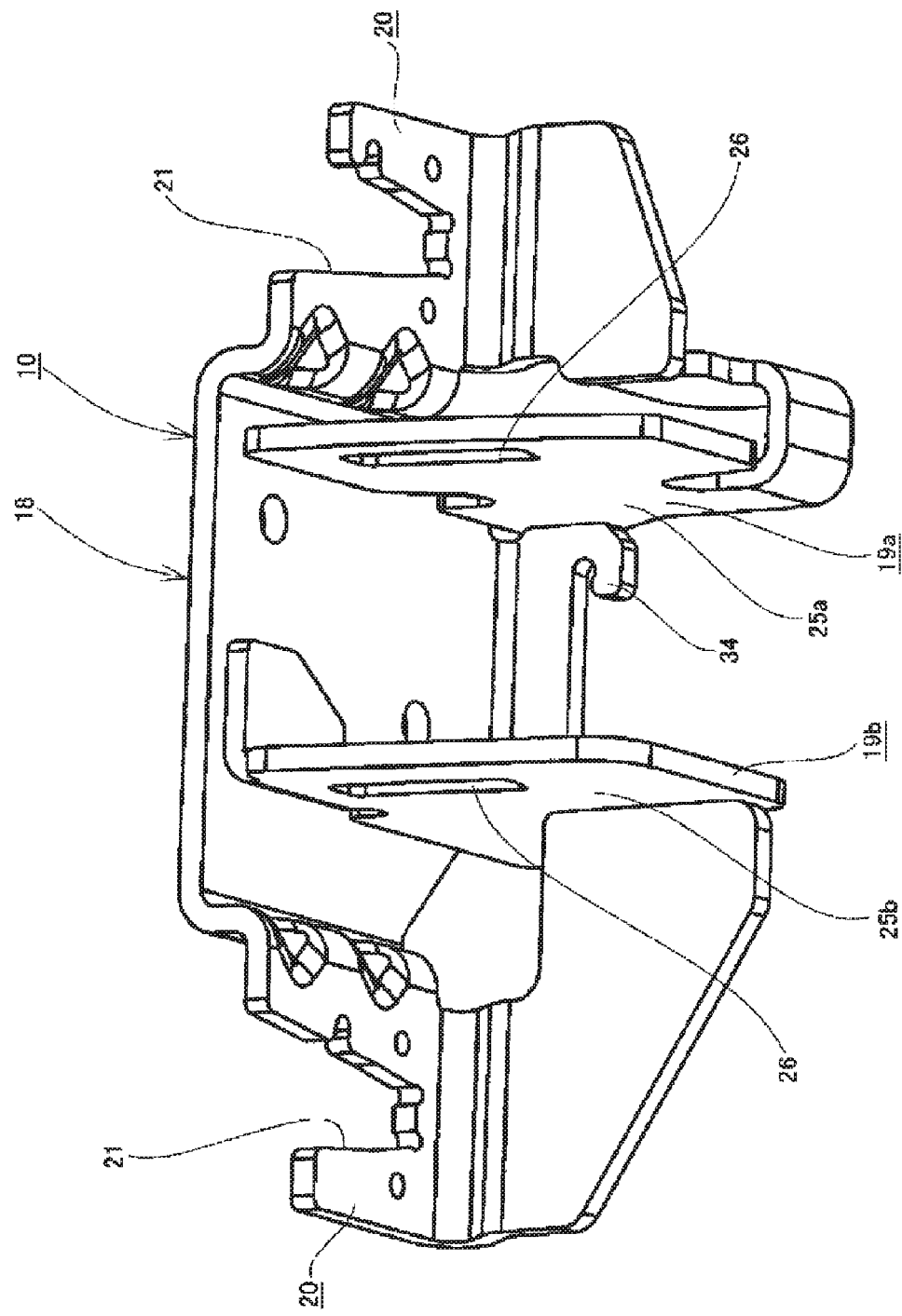
FIG. 18 is a perspective view of an example of an impact absorbing steering apparatus of the related art, depicting a support bracket seen from a rear-lower direction.
Figure 19A:
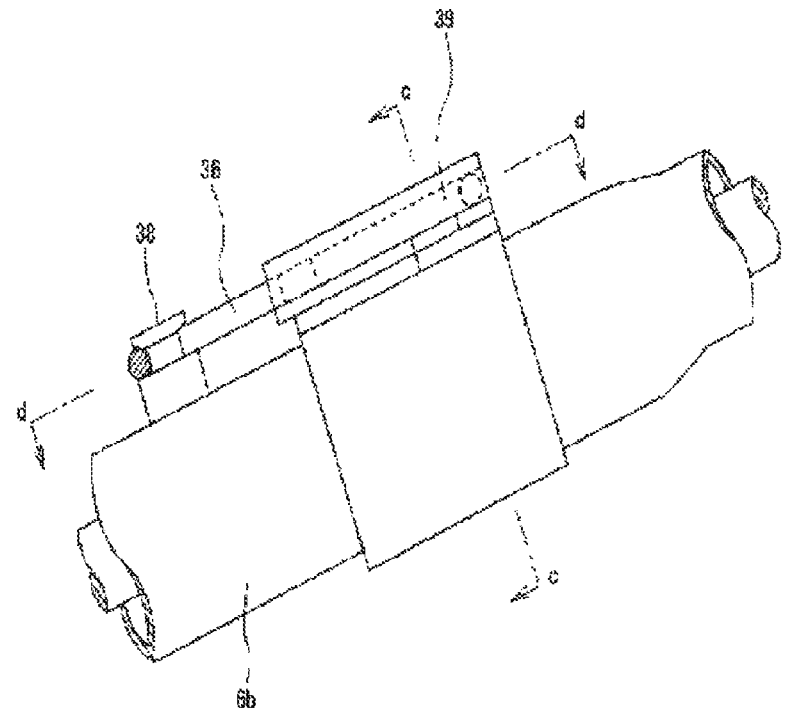
FIG. 19A is a partial side view of a steering column in which an energy absorbing member of the related art is incorporated.
Figure 19B:
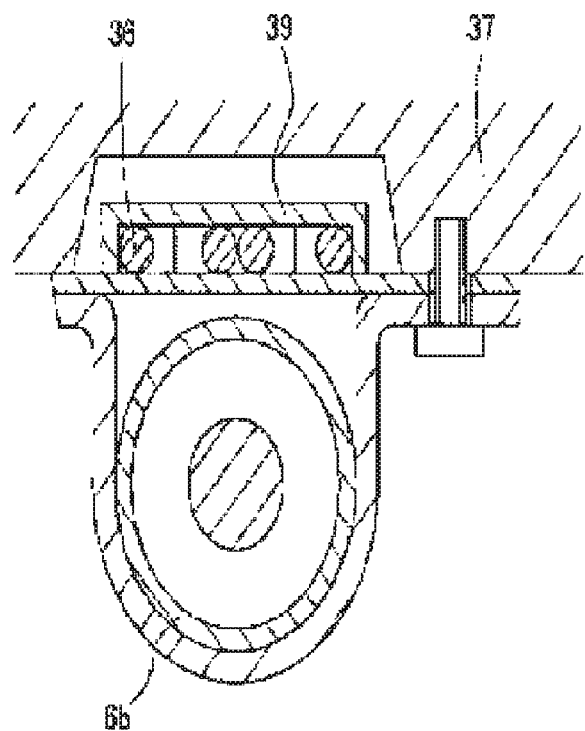
FIG. 19B is a c-c sectional view of FIG. 19A.
Figure 20A:
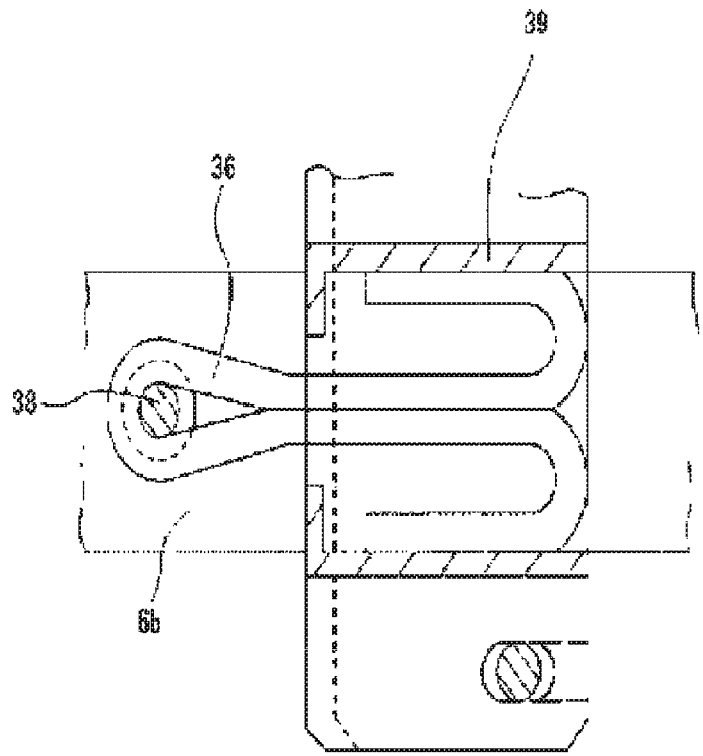
FIG. 20A is a d-d sectional view of FIG. 19A at a normal state.
Figure 20B:
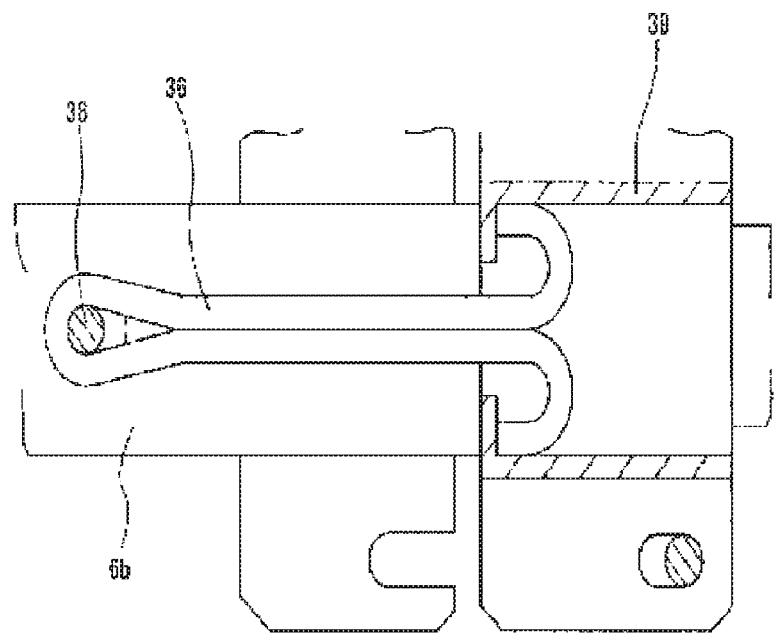
FIG. 20B is a d-d sectional view of FIG. 19A at a state after a secondary collision occurs.

An analysis result is shown in FIG. 13. For all the materials, as the stroke amount increases, i.e., as the width of the notch 56 in the left-right direction decreases, the absorption load tends to increase. The absorption load is highest for brass, is second highest for aluminum and is lowest for the synthetic resin. The absorption load is different depending on the materials. It is thought that this is caused due to a difference of the strain energy based on the tensile strength, the elongation and the like. For POM-GF25, the strain energy is low because the tensile strength is low. For brass, the strain energy is high because the tensile strength is high. Therefore, when the higher absorption load is required, it is preferably to adopt brass as the material of the energy absorbing member 36a. Also, as the material of the energy absorbing member 36a, the other materials of which the tensile strength and the elongation are equivalent to brass can be appropriately used.

INDUSTRIAL APPLICABILITY

In the above illustrative embodiment, the present invention has been applied to the structure including both the telescopic mechanism for adjusting the position of the steering wheel in the front-rear direction and the tilt mechanism for adjusting the position of the steering wheel in the up-down direction. However, the impact absorbing steering apparatus to which the present invention is to be applied may have only one of the telescopic mechanism and the tilt mechanism. Also, the present invention can be applied to a structure having none of the telescopic mechanism and the tilt mechanism, i.e., a structure having no position adjustment device of the steering wheel. For example, when applying the present invention to a structure having only the telescopic mechanism, from the shown illustrative embodiment, the through holes formed in the holding plate parts 25c, 25d can be made as simple circular holes through which the tightening rod 27a can be inserted, instead of the long holes 26a, 26b in the up-down direction. Also, when applying the present invention to a structure having only the tilt mechanism, from the shown illustrative embodiment, the through holes formed in the held wall parts 11a, 11a can be made as simple circular holes through which the tightening rod 27a can be inserted, instead of the long holes 28, 28 in the front-rear direction. Furthermore, when applying the present invention to a structure having no position adjustment device, the long holes 26a, 26b in the up-down direction and the long holes 28, 28 in the front-rear direction are made as simple circular holes. Like this, when applying the present invention to a structure having no position adjustment device, the tightening rod can be a bolt, and the pair of pressing parts can be configured by a head of the bolt and a nut that is to be screwed onto the bolt. In this case, the nut is one pressing part and functions as a fixing means.

The subject application is based on a Japanese Patent Application No. 2014-227837 filed on Nov. 10, 2014, which is herein incorporated for reference.

DESCRIPTION OF REFERENCE NUMERALS

1: steering wheel, 2: steering gear unit, 3: input shaft, 4: tie-rod, 5, 5a, 5b: steering shaft, 6, 6a, 6b, 6c: steering column, 7: universal joint, 8: intermediate shaft, 9: universal joint, 10, 10a: support bracket, 11, 11a: held wall part, 12: vehicle body-side bracket, 13, 13a: outer column, 14, 14a: inner column, 15: electric motor, 16: housing, 17, 17a: support pipe, 18: top plate, 19a. 19b: side plate, 20: connection plate part, 21, 21a: notch, 22, 22a: capsule, 23: through-hole, 25a, 25b, 25c, 25d: holding plate part, 26, 26a, 26b: long hole in a up-down direction, 27, 27a: tightening rod, 28: long hole in a front-rear direction, 29: collar part, 30, 30a: driving cam, 31, 31a: driven cam, 32, 32a: cam unit. 33, 33a: adjustment lever. 34: locking part, 35, 35a: balancing spring, 36, 36a: energy absorbing member, 37: vehicle body, 38: support pin, 39: holding case, 40: electric power steering apparatus, 41: housing, 42: bridge, 43: slit, 44: outer shaft, 45: inner shaft, 46: attaching plate part, 47, 47a: tilt spacer. 48: telescopic spacer. 49: washer, 50: thrust bearing, 51: nut, 52: attachment hole, 53: hook part, 54: guide part, 55: absorption part, 56: notch, 56a: first constant width portion, 56b: first tapered portion, 56c: second constant width portion. 56d: second tapered portion. 57: stopper part, 60: spacer, 65: restoring spring. 70: multiple plate

The invention claimed is:

1. An impact absorbing steering apparatus, comprising:
an inner column disposed at a front side with a position thereof in a front-rear direction being regulated;
an outer column fitted to an outer side of a rear part of the inner column and configured to extend and contract a diameter of a front part, which is a fitting part with the inner column, by a slit axially provided to the front part;
a steering shaft formed by combining an outer shaft and an inner shaft so that an entire length thereof can be contracted, being rotatably supported to an inner diameter-side of a steering column having the inner column and the outer column, and having a rear end portion protruding backward beyond a rear end opening of the outer column;
a steering wheel supported to the steering shaft;
a pair of held wall parts provided at positions at which the held wall parts sandwich the slit from both left and right sides at the front part of the outer column;
a pair of long holes in a front-rear direction formed at positions at which the pair of held wall parts are aligned with each other;
a support bracket having a pair of left and right holding plate parts and an attaching plate part configured to support the pair of the holding plate parts to a vehicle body, the attaching plate part being supported to the vehicle body so that it can be detached forward based on impact load to be applied during a secondary collision;
a pair of long holes in an up-down direction formed at portions of the pair of holding plate parts at which the long holes are aligned with the pair of long holes in the front-rear direction;
a tightening rod that is to be inserted into the pair of long holes in the front-rear direction and the pair of long holes in the up-down direction; a fixing means expanding and contracting an interval between a pair of pressing parts provided at both end portions of the tightening rod, contracting the diameter of the front part of the outer column in contraction of the interval, and frictionally engaging an inner periphery of the front part of the outer column and an outer periphery of a rear part of the inner column, and
an energy absorbing member configured to absorb impact energy that is to be applied to the outer column from the steering wheel during the secondary collision,
wherein the energy absorbing member is fixed to the outer periphery of the inner column, extends in the front-rear direction and is introduced into the slit of the outer column, and
wherein during the secondary collision, the tightening rod is displaced forward together with the outer column, so that the energy absorbing member is crushed by the tightening rod and generates impact absorption load while the energy absorbing member is restrained to the tightening rod and the inner column from the up-down direction.

2. The impact absorbing steering apparatus according to claim 1,
wherein a notch is provided on an upper surface of the energy absorbing member.

3. The impact absorbing steering apparatus according to claim 2,
wherein the notch is formed at a center in a left-right direction of the upper surface of the energy absorbing member.

4. The impact absorbing steering apparatus according to claim 2,
wherein a width of the notch in the left-right direction is varied as it goes in the front-rear direction.

5. The impact absorbing steering apparatus according to claim 4,
wherein the width of the notch in the left-right direction decreases as it goes forward.

6. The impact absorbing steering apparatus according to claim 1,
wherein the outer periphery of the inner column is formed with an attachment hole for attaching the energy absorbing member, and
wherein the energy absorbing member comprises a guide part configured to be engaged to the attachment hole and a hook part configured to be hooked to an inner surface of the inner column and to prevent the energy absorbing member from being detached from the attachment hole.

7. The impact absorbing steering apparatus according to claim 6,
wherein the energy absorbing member is integrally formed with the guide part and the hook part.

8. The impact absorbing steering apparatus according to claim 1,
wherein the energy absorbing member comprises an arc-shaped mounting surface so that it is mounted to the outer periphery of the inner column.

9. The impact absorbing steering apparatus according to claim 1,
wherein a front end of the outer column is provided with a bridge in which the energy absorbing member is to be inserted, and
wherein the bridge of the outer column that is to be displaced forward due to the secondary collision is displaced with guiding the energy absorbing member.

10. The impact absorbing steering apparatus according to claim 1,
wherein a clearance is provided in the front-rear direction between the energy absorbing member and the tightening rod so that load, which occurs when the attaching plate part of the support bracket is detached forward due to impact load applied during the secondary collision, and load, which occurs when the energy absorbing member is crushed by the tightening rod, do not overlap.

11. The impact absorbing steering apparatus according to claim 1,
wherein the energy absorbing member is made of brass.

* * * * *